United States Patent [19]

Rajchman

[11] 4,331,972

[45] May 25, 1982

[54] LIGHT VALVE, LIGHT VALVE DISPLAY, AND METHOD

[76] Inventor: Jan A. Rajchman, 268 Edgerstoune Rd., Princeton, N.J. 08540

[21] Appl. No.: 959,055

[22] Filed: Nov. 9, 1978

[51] Int. Cl.[3] .................................... H04N 9/31

[52] U.S. Cl. .................................... 358/60; 350/162 R

[58] Field of Search .................... 358/58, 60, 61, 230, 358/231, 232, 235, 236; 350/162 R

[56] References Cited

U.S. PATENT DOCUMENTS

| | | | |
|---|---|---|---|
| 2,457,415 | 12/1948 | Sziklai | 358/58 |
| 3,493,287 | 2/1970 | Lohmann | 350/162 R |
| 3,603,668 | 9/1971 | DeButetto | 350/162 R |

*Primary Examiner*—Richard Murray
*Attorney, Agent, or Firm*—Milton S. Winters

[57] ABSTRACT

A light valve comprises a pair of elements of transparent material each comprising a diffraction grating of like periodicity facing each other with parallel grating lines. Such a light valve is termed herein a bigrate. The transmission of light through the bigrate will depend on the relative position of the pair of gratings in the direction perpendicular to the grating lines and means may be provided for moving the elements relative to each other in that direction. One of the gratings may be embossed on a polyvinylidene fluoride ($PVF_2$) strip and moved by piezoelectric means, which may be a portion of such a strip. One strip may then be moved relative to the other in response to an electrical signal to control the zero diffraction order light transmission from no transmission to full transmission, or any desired intermediate transmission. Two intersecting sets of polyvinylidene fluoride ($PVF_2$) strips are arranged to form a matrix of bigrates, which, when uniformly illuminated produce a display of images, such as television images. In one set video signals produce motion perpendicular to the horizontal grating lines. The other set is made to move in a direction perpendicular to its surface in order to lock the strips of the first set in desired positions, or to unlock them, for example, a line at a time. Line-at-a-time TV signals may thus control the images. Three superimposed matrices each with diffraction lines of grating depth different from the others may provide color images.

81 Claims, 37 Drawing Figures

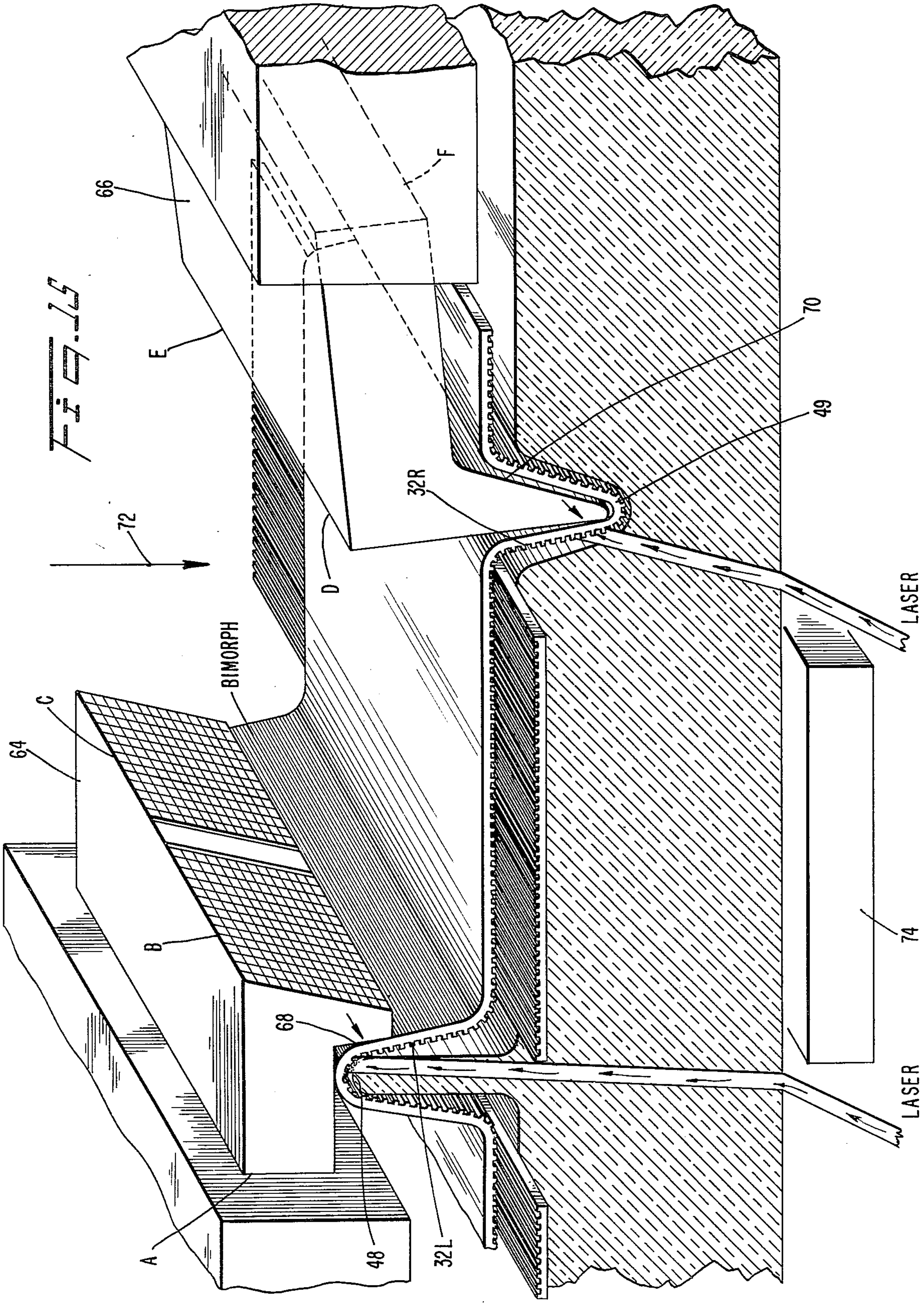
66
F
E
70
49
32R
72
D
BIMORPH
C
64
B
68
A
48
32L
LASER
LASER
74

FIG. 16
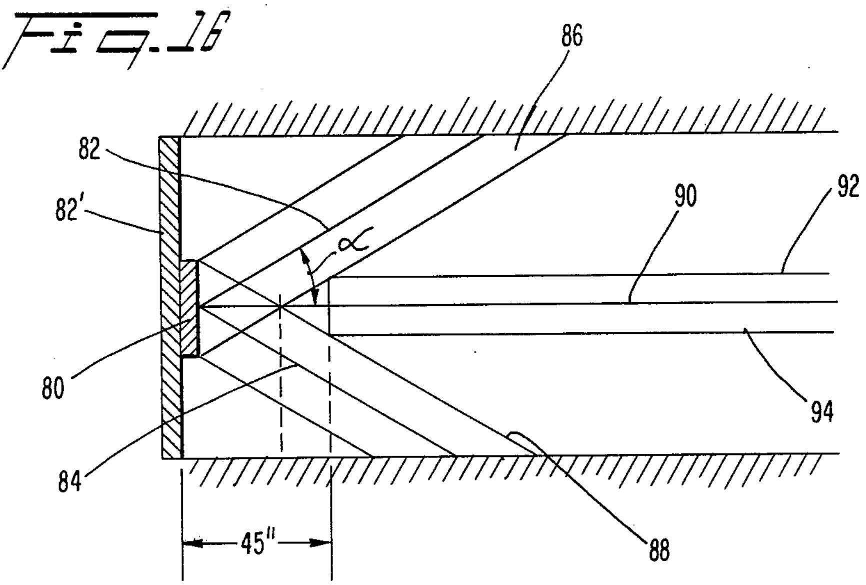
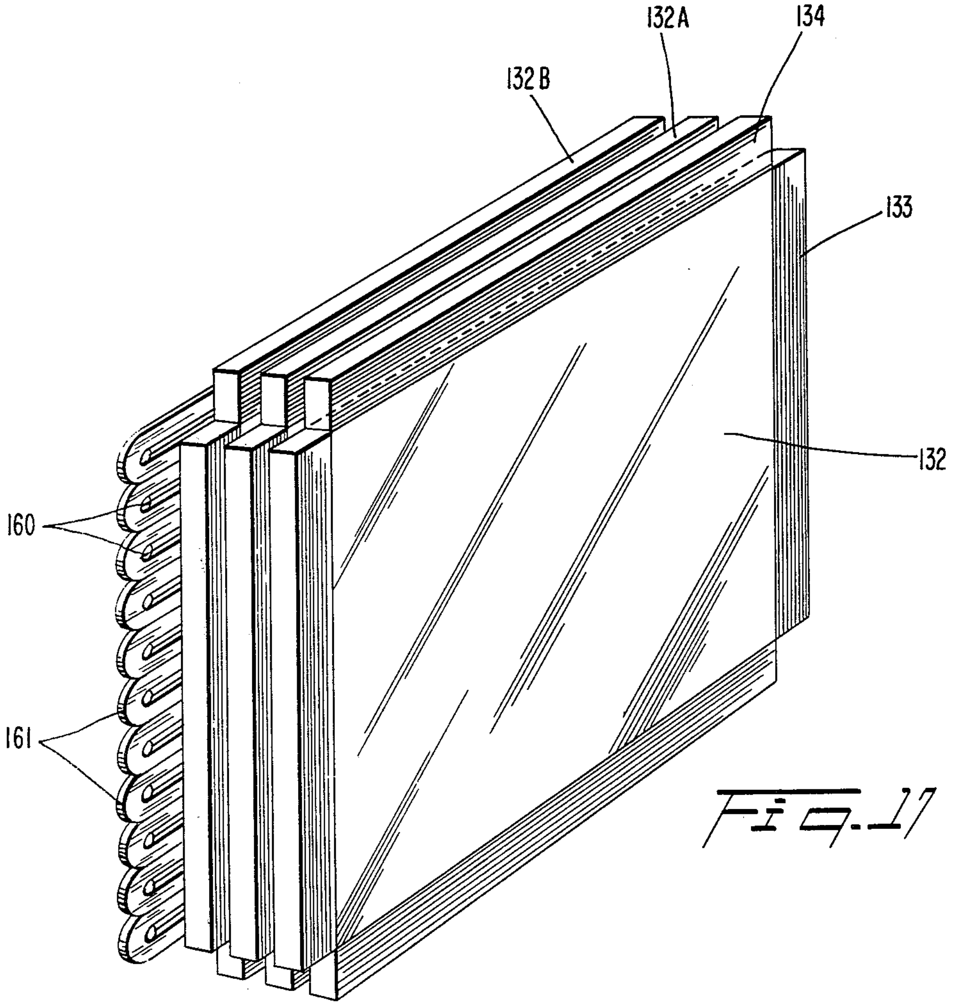
FIG. 17

Fig. 22a
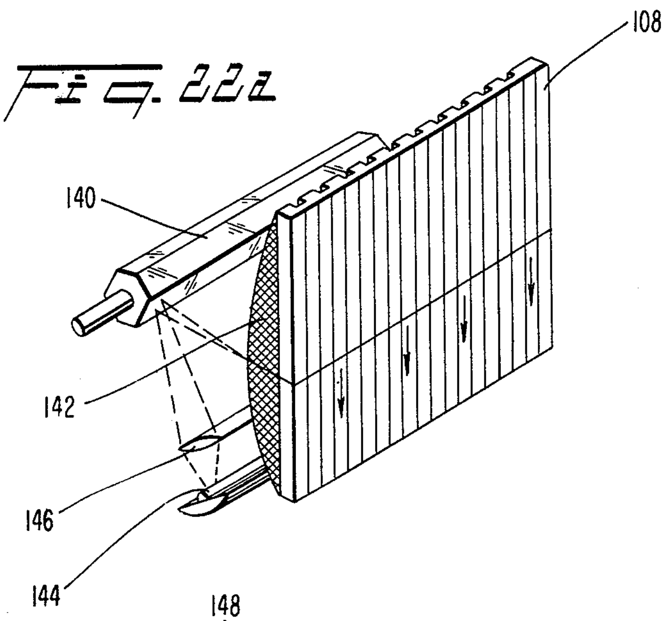
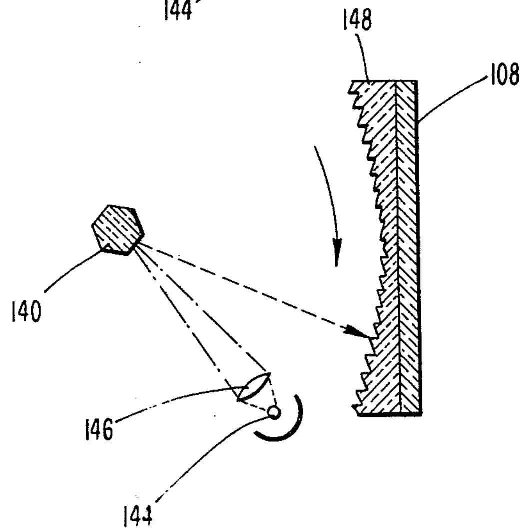
Fig. 22b
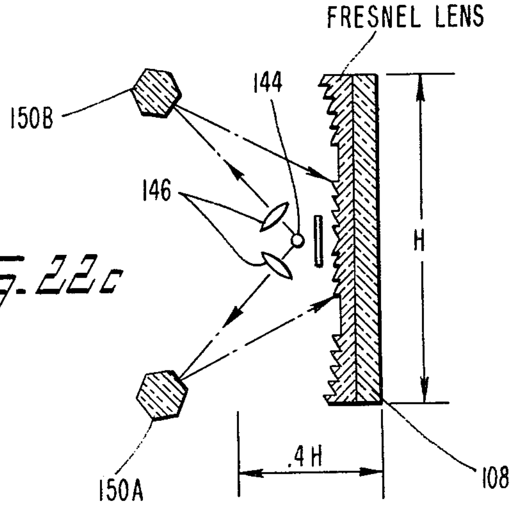
Fig. 22c

LIGHT VALVE, LIGHT VALVE DISPLAY, AND METHOD

BACKGROUND OF THE INVENTION

1. Field of the Invention

The invention relates to light valves, and to displays using light valves, including television displays.

2. Description of the Prior Art

It has been suggested that the transmission of light from phase gratings may be used for purposes of display for instance, in making a microfiche or the like or in slide projectors. See, for example, R. Bartolini et al., Applied Optics, Vol. 9 (1970) p. 2283 and M. T. Gale et al., Micrographics, Vol. 8 (1975) p. 225. It has also been suggested that relief diffraction gratings may be used for display purposes[1,2] (numbered references will be found at the end of the specification), and the theory will be discussed briefly hereinafter to the extent desirable for an understanding of the present invention. It is also known that $PVF_2$ may be made to exhibit a piezoelectric effect[3]. The effect and some of its various possible applications are discussed at greater length in an article in Science, "Flexible $PVF_2$ Film: An Exceptional Polymer for Transducers" Vol. 200, June 23, 1978, pp. 1371–1374.

Display effects using a piezoelectric effect are suggested in U.S. Pat. No. 3,172,221 to Ochs, Jr., Dated Mar. 9, 1965. Displays employing diffraction grating effects are suggested in U.S. Pat. No. 3,861,784 to Torok, dated Jan. 21, 1975; U.S. Pat. No. 3,752,563 to Torok et al., dated Aug. 14, 1973; U.S. Pat. No. 4,082,425 to Miller, dated Apr. 4, 1978; and U.S. Pat. No. 4,011,009 to Lama et al., dated Mar. 8, 1977.

U.S. Pat. No. 3,942,048 to Laude et al., dated Mar. 2, 1976 describes a method for modulating the blaze angle of a diffraction grating by an applied voltage. U.S. Pat. No. 3,347,614 to Fuller dated Oct. 17, 1967 describes a display comprising identical panel elements hermetically scaled and containing magnetic film and colloidal iron suspension and each excited to diffract light to create in total an optical image.

U.S. Pat. No. 3,347,614 to Fuller et al, dated Oct. 17, 1967, describes a display device using diffraction effects associated with a suspension of ferromagnetic particles in a liquid overlying a ferromagnetic film.

U.S. Pat. No. 3,782,806 to Barkley et al, dated Jan. 1, 1974 describes a light switch using polarization filtering and a ferroelastic effect in certain types of crystals to provide an optical switch, and can be used to provide line scanning.

U.S. Pat. No. 3,897,997 to Kalt, dated Aug. 5, 1975, describes a display device using flexible elements electrostatically actuated, and U.S. Pat. No. 1,888,893 to Tschorner, Nov. 22, 1932, suggests a picture reproducing device for television using two superimposed line or cross screens the relative motion of which can expose only the single element at the intersection to light transmission.

Other U.S. patents which may be of interest are U.S. Pat. No. 3,957,354, dated May 18, 1976 to Knop; U.S. Pat. No. 4,057,326, dated Nov. 8, 1977, to Gale; U.S. Pat. No. 4,082,453, dated Apr. 4, 1978, to Knop; and U.S. Pat. No. 4,082,438, dated Apr. 4, 1978, to Knop.

B. SUMMARY OF THE INVENTION

In one aspect the invention is directed to controlling the transmission of light by the relative positioning of one phase grating on a transparent element with respect to another closely facing phase grating with parallel lines of the same periodicity on another transparent element. Preferably the gratings each afford a quarter wavelength delay. The gratings may be formed of sinusoidal variations or the like, or may be rectangular and may be embossed on plastic strips. According to one feature of the invention, means are provided for moving one of the pair of strips relative to the other by means of a piezoelectric force, and preferably the plastic is $PVF_2$ and the piezoelectric force is exerted on a portion of one of the strips.

According to another feature of the invention, one strip is movable in a direction perpendicular to the grating lines to reach a desired position of selected light transmission. The one strip may then be locked into place by expanding the other strip in the matrix to give a storage effect. The locking strip is relaxed when the movable grating strip is to be relatively repositioned. By arranging the pairs in a crossed grid, a TV type display may be formed; three such displays may provide a color TV type display.

According to one aspect of the invention, an element subject to a restoring force of the type to impart sinusoidal oscillations is locked or stopped substantially at the position corresponding to null force by exerting a locking force substantially one quarter of said sinusoidal period after inception of initiation of the restoring force. In this way the distance or amount by which the element is initially displaced from the desired null force point is substantially immaterial. This principal is employed to lock the movable bigrate strip at a point corresponding to the signal applied in the TV type display described above.

DESCRIPTION OF THE DRAWINGS

The various objects, advantages, and novel features of the invention will be more fully apparent from the following detailed description when read in connection with the accompanying drawings in which:

FIG. 8 comprises FIGS. 8*a* and 8*b* which illustrate how zero order transmission of light through a bigrate strip may be controlled using the piezoelectric effect of both strips;

FIG. 9 comprises FIG. 9*a* illustrating the piezoelectric effect on $PVF_2$ film, FIG. 9*b* illustrating the construction of a so-called bi-morph, and FIG. 9*c* illustrating the bending effect of a bi-morph in response to an electric field;

FIG. 11 comprising

FIG. 15 is a somewhat schematic view illustrating one method for aligning the gratings of a pair of the bigrate strips;

FIG. 16 shows the directions of the zero order and first order light transmission from a bigrate display;

FIG. 17 is a schematic view of a wall display device embodying the invention;

FIG. 22 comprising FIGS. 22*a*, 22*b*, and 22*c* illustrate various ways in which light for the display of FIGS. 18, 19, and 20 may be initially collimated.

DETAILED DESCRIPTION

1. Introduction

Figure 1A:
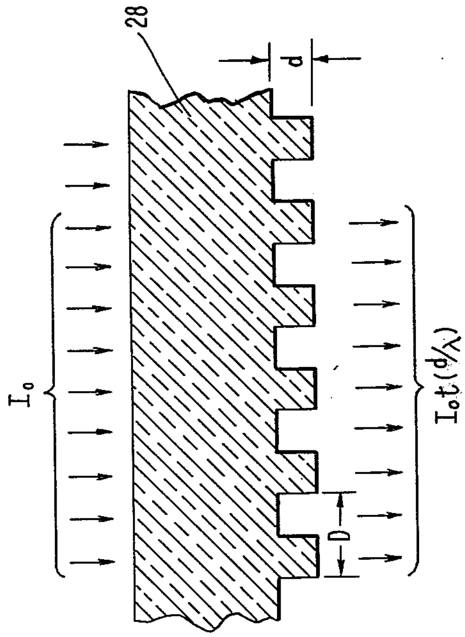
FIG. 1 comprises FIG. 1*a* which is a diagrammatic showing of a rectangular grating and FIG. 1*b* is an idealized graph showing the zero order transmission as a function of the ratio of grating depth to light wavelength.

Light valves for electrically controlling the transmission of light would have many more applications than they have if fast acting valves requiring low power could be made at low cost. A flat TV display could be made by uniformly illuminating a matrix of such light valves. This would be an economical way to make a self-luminous TV display, particularly if color could be obtained simply. The present application describes such a valve.

One way of obtaining precisely such light valves is to piezoelectrically shift by a submicron one grating embossed in plastic with respect to another identical such grating. Light is fully transmitted when the two gratings are positioned so that the troughs in one match peaks in the other, as in that condition there is effectively no grating. On the other hand, light is not transmitted but fully diffracted when the peaks, or troughs of one grating match the peaks, or troughs of the other. This is the condition of "non-transmission of the zero order diffraction" exploited in the recently described RCA microfiche. See also U.S. Pat. No. 4,062,628 to Gale. Also recently, it has been discovered that a certain plastic film—polyvinylidene fluoride or $PVF_2$ film—has very strong piezoelectric properties. These films are transparent and can be embossed with gratings. Furthermore, motions due to piezoelectricity can be greatly amplified either by proper mechanical structuring or by bonding two layers in a "bimorph", as has been recently described[3]. Hence, electrically controlled light valves can be made using suitably structured polyvinylidene plastic strips embossed with diffraction gratings.

It turns out that such light valves made of two shiftable diffraction gratings—or "bigrates"—have nearly ideal properties for making a color TV display. Speed is sufficient for a line-at-a-time system. Drive requirements on the lines are only a few volts and total control power is about 70 watts. There is a mechanical way to insure x-y addressability and storage at the element. Furthermore, color filtering is obtained simply by using square diffraction gratings.

The bigrate light valve and its applications to a flat color TV display are analyzed in some detail in the following description. 2. Two Gratings Light Valve (Bigrate)

(a) Principle

A light valve action is obtained by shifting in a direction perpendicular to the grating lines, one with respect to the other, two identical gratings of appropriate amplitude. To appreciate this effect, consider first the "zero-order-diffraction" gratings recently described by Knop[1] and Gale[2].

Figure 1B:
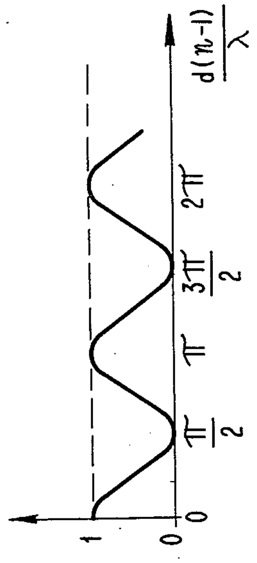

In general, a square-wave or rectangular phase grating of depth (or amplitude) d and periodicity D, transmits a fraction t of impinging or incident light $I_0$ and diffracts the rest in first and higher orders. It turns out that the zero order transmission is proportioned to the factor t which depends on the ration of d/λ, where λ is the wave length of the incident light $I_0$. The factor t may be expressed as:

$$t(d/\lambda) = \cos^2\left(\pi\frac{d(n-1)}{\lambda}\right) \quad (1)$$

where n is the index of refraction of the grating material 28. (See FIG. 1*a*) Hence for a grating of amplitude $d_0$ $$d_0(n-1) = \lambda(m+\tfrac{1}{2}) \quad (2)$$

where m is zero or an integer, there is no transmission. See FIG. 1*b*. (Such non-transmitting gratings are used in the RCA microfiche by selectively destroying the gratings at locations where it is desired to have transmission.[1,2])

This non-transmission of light through a grating (of proper amplitude $d_0$) is truly remarkable, as the grating made of transparent material appears opaque. The non-transmission can be conveniently considered as being due to the cancellation of half the light through the troughs of the grating with the other half passing through the peaks where it is delayed by precisely half-wave.

Figure 2A:
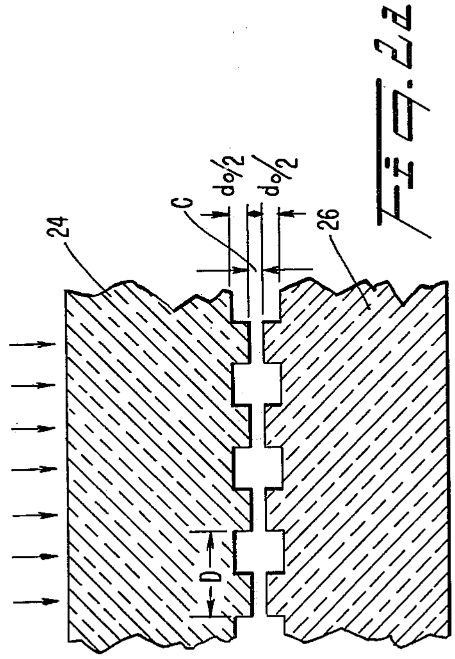
FIG. 2 comprises FIG. 2*a* and FIG. 2*b* which illustrate the effect of two different relative longitudinal positions for minimum and maximum zero order transmission respectively of the two parts of a so-called bigrate, i.e. a pair of closely juxtaposed, relatively positionable, like dimensioned gratings facing each other and for which the depth of each grating affords a quarter wavelength phase delay.
Figure 2B:
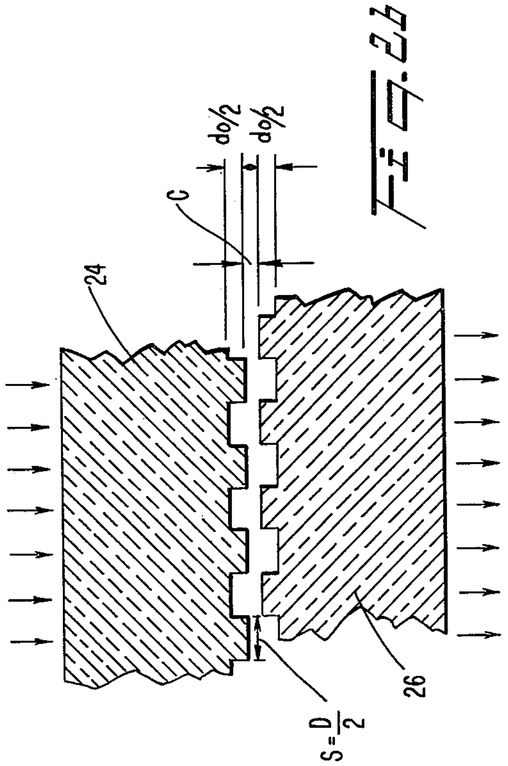

Consider now two identical gratings in transparent material or blocks 24, 26 of amplitude $d_0/2$ spaced from each other by a small clearance c, as in FIG. 2. When the peaks and troughs of the two gratings are aligned, as in FIG. *2a*, the result is equivalent to a single grating of amplitude $d_0$ hence there is no zero order light transmission. On the other hand, when the peaks of one grating are aligned with the troughs of the other, as in FIG. *2b*, the zero order diffracting properties of the combination are essentially destroyed. Indeed at all locations light is delayed by a quarter wave (plus the small clearnace) and there is no cancellation and hence full transmission.

Therefore it is sufficient to shift one grating (of amplitude $d_0/2$) in the direction perpendicular to the grating lines with respect to another identical one by one half the grating periodicity D ($s=D/2$) to obtain either full or no transmission. The shift s can be very small, e.g. 0.7 μm (micrometer) for gratings of periodicity $D=1.4$ μm which have been reported.[1,2]

Figure 3A:
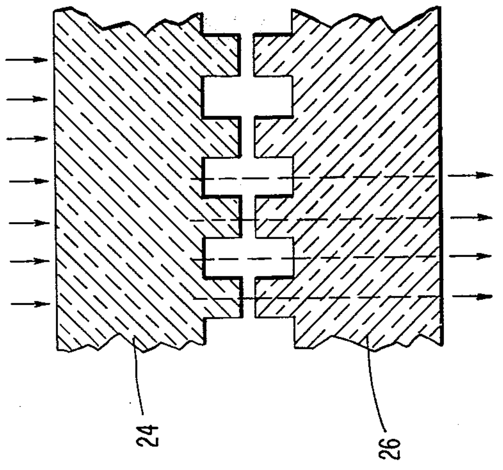
FIG. 3 comprises FIGS. 3*a* and 3*b* which illustrate the effect of two different relative positions of a pair of gratings for maximum and reduced zero order transmission respectively of the two parts of bigrate for which the depth of each grating affords a half wavelength phase delay.
Figure 3B:
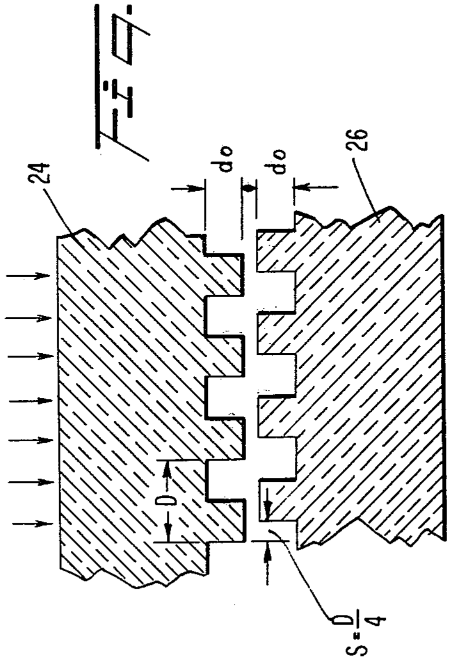
Figure 4A:
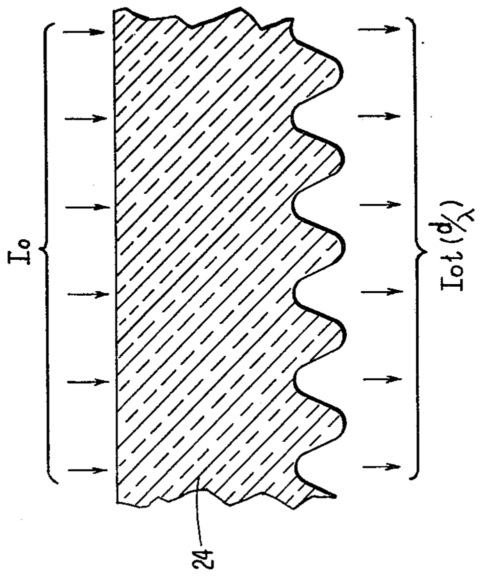
FIG. 4 comprises FIGS. 4*a* and 4*b* which illustrate respectively a sinusoidal phase grating of half wavelength depth and an idealized curve of zero-order transmission plotted as a function of the ratio of the grating depth to the wavelength of the light.
Figure 4B:
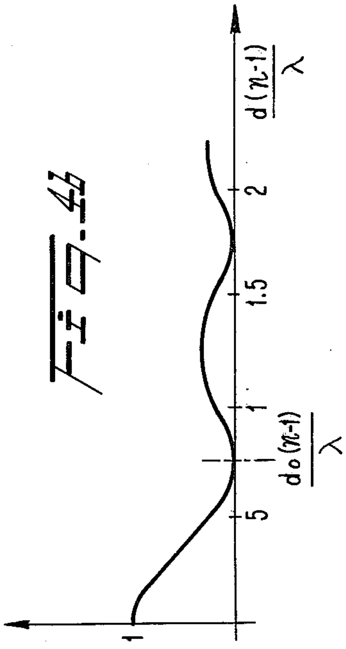

Only half the shift is sufficient for total on-off light valve action, if the two gratings each have an amplitude $d_0$, as defined by equation 2. (See FIG. 3) When the peaks and the troughs of the gratings are aligned, as in FIG. *3a*, there is full transmission because at the peaks light is delayed by a full wave with respect to the light passing through the troughs, hence there is no cancellation. On the other hand, a shift of $s=D/4$ results in no transmission (FIG. *3b*); in that case there are four zones in each grating period, two in which the light is delayed by half-wave ($d_0$) with respect to the other two.

The depth $d_0$ defined by equation (2) is valid for all integer values of m. It is the smallest for $m=0$, in which case it has the value $$d_o = \frac{\lambda}{2(n-1)} \tag{2a}$$

This value will be assumed in the following unless otherwise specified.

It must be appreciated also that deeper gratings ($m\neq0$) can be used as was pointed out by Knop and Gale for the case of microfiche. For the case of the bigrate light valve it is possible to use unequal depths in the two gratings, as long as the sum of the two depths is an integral multiple of $d_0$. When that integer is odd a shift s of half the periodicity D is required for full on-off control. When that integer is even, that shift need only be a quarter of the periodicity.

It can also be pointed out that generally a plane grating is a transparent flat sheet having one plane surface and the other surface that which is generated by a straight line moving parallel to itself and to the plane surface and whose distance to the plane surface varies periodically. When the variation is sinusoidal, the grating is called a sinusoidal plane grating. When it varies rectangularly, that is the distance has one of two values, the grating is called a rectangular phase grating.

A light valve made of two identical gratings that are shifted one with respect to the other will be called "bigrate".

(b) Color and black-and-white

The square wave grating transmission is dependent on the ratio d/λ of the amplitude of the grating d to the wavelength λ of the incident light. For a given amplitude the grating is a color filter. Knop[1] has shown that three different amplitudes can be chosen so that cyan, magenta and yellow colors are obtained from white light. By superimposing three zero-order-diffraction (ZOD) microfiche images with these colors, very good rendition of natural colors is obtained.

The transmission of a sinusoidal grating as in FIG. *4a* is also dependent on the ratio d/λ of amplitude of the grating to the wavelength of the incident light, and follows the form of a Bessel function squared (See FIG. *4b*). The transmitted light is proportioned to the transmission factor t, which in this case takes the form:

$$t(d/\lambda) = Jo^2\left(\pi\frac{d(n-1)}{\lambda}\right)$$

However the dependence on the wavelength near the amplitude $d_0$ of zero transmission is not very rapid so that the sinusoidal grating is reasonably panchromatic. Gale has shown that two such gratings of slightly different amplitudes placed at right angles to each other provide the basis for an extremely contrasty black-and-white microfiche.

Figure 5A:
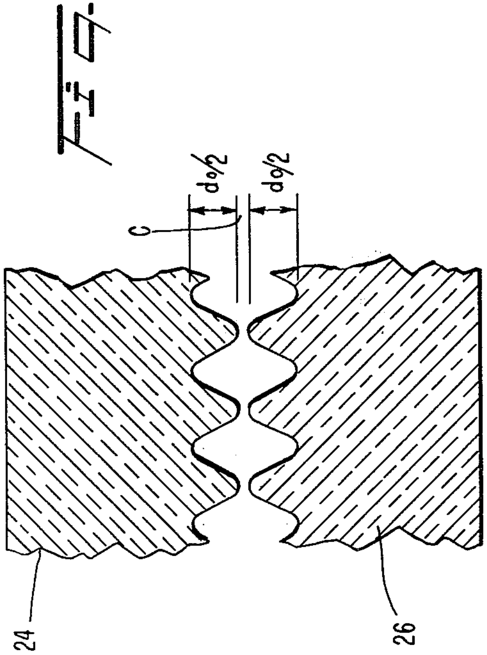
FIG. 5 comprises FIGS. 5*a* and 5*b* which illustrate the effect of two different relative positions for minimum and maximum zero order transmission respectively of the two parts of a sinusoidal bigrate.
Figure 5B:
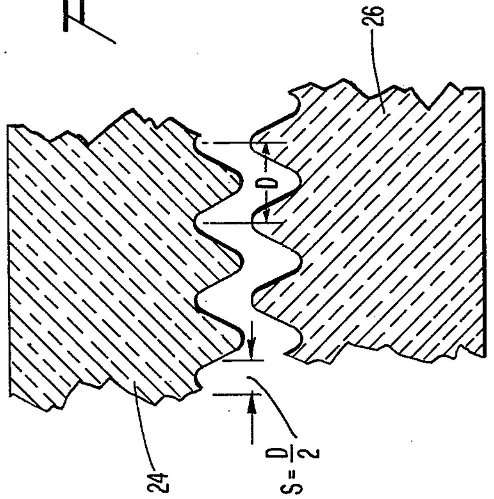

A light valve can be made from two sinusoidal gratings as is shown in FIG. 5. Gratings with amplitude $d_0/2$ require shifts of $s=D/2$ and gratings with amplitude $d_0$ require shifts of $s=D/4$ to pass from no transmission to maximum transmission, just as is the case with square gratings.

In the following discussion square wave gratings will be considered for all descriptions and analyses because color control with three superimposed light valves is particularly attractive. However, it must be understood that all techniques described for the square or rectangular gratings are applicable to sinusoidal gratings.

(c) Collimation, angle of view and tolerances

Light impinging on a zero-order diffraction grating should be collimated and strike normally. However, there is considerable tolerance in the striking angle. Indeed the delay corresponding to a slanting ray, proportional to d (FIG. *6a*) differs little from the delay of a normal ray which is proportional to $d_0$. Note also that the transmission t as a function of d is at a minimum for $d_0$ and hence varies very slowly for small deviations from $d_0$. The large tolerance with respect to the striking angle can be appreciated by observing a ZOD (zero order diffraction) microfiche held against a light source, even a diffuse light source, at a distance of about a foot from the eye. A perfectly contrasty picture is seen even when the microfiche is tilted by some 20 degrees.

Similar tolerances in light collimation and striking angle apply to the bigrate light valve as long as the two gratings are not too far apart, i.e. the clearance c is small. This can be appreciated by the inspection of FIG. *6b*. While the clearance c can be as much as several $d_0$, it is clear that it should not be orders of magnitude greater than $d_0$. For that reason it is unlikely that in practice, thin enough plastic sheets could be used to allow the gratings to be on the outside rather than the inside of the sandwich. On the other hand, the large tolerance in the clearance c makes it possible to use films that are only reasonably flat.

3. Piezoelectric Polymer Films (a) Film Properties

The small shift of one grating with respect to the other necessary for the operation of the bigrate can be obtained by using the piezoelectric properties of certain polymer plastic films. Of particular interest is a polyvinylidene flouride ($PVF_2$) developed in recent years, for example, by Kureha Chemical Industry Ltd. of Japan, after the description of the material by Kuwai in 1969. Since that time these films have been used in microphones and loudspeakers, and their properties have been investigated widely. The films have strong anisotropy and piezoelectric properties that are obtained by stretching, heat treatment and electrical polarization. The films are transparent.

Figures 7, 8A, 8B, 9A, 9B, 9C:
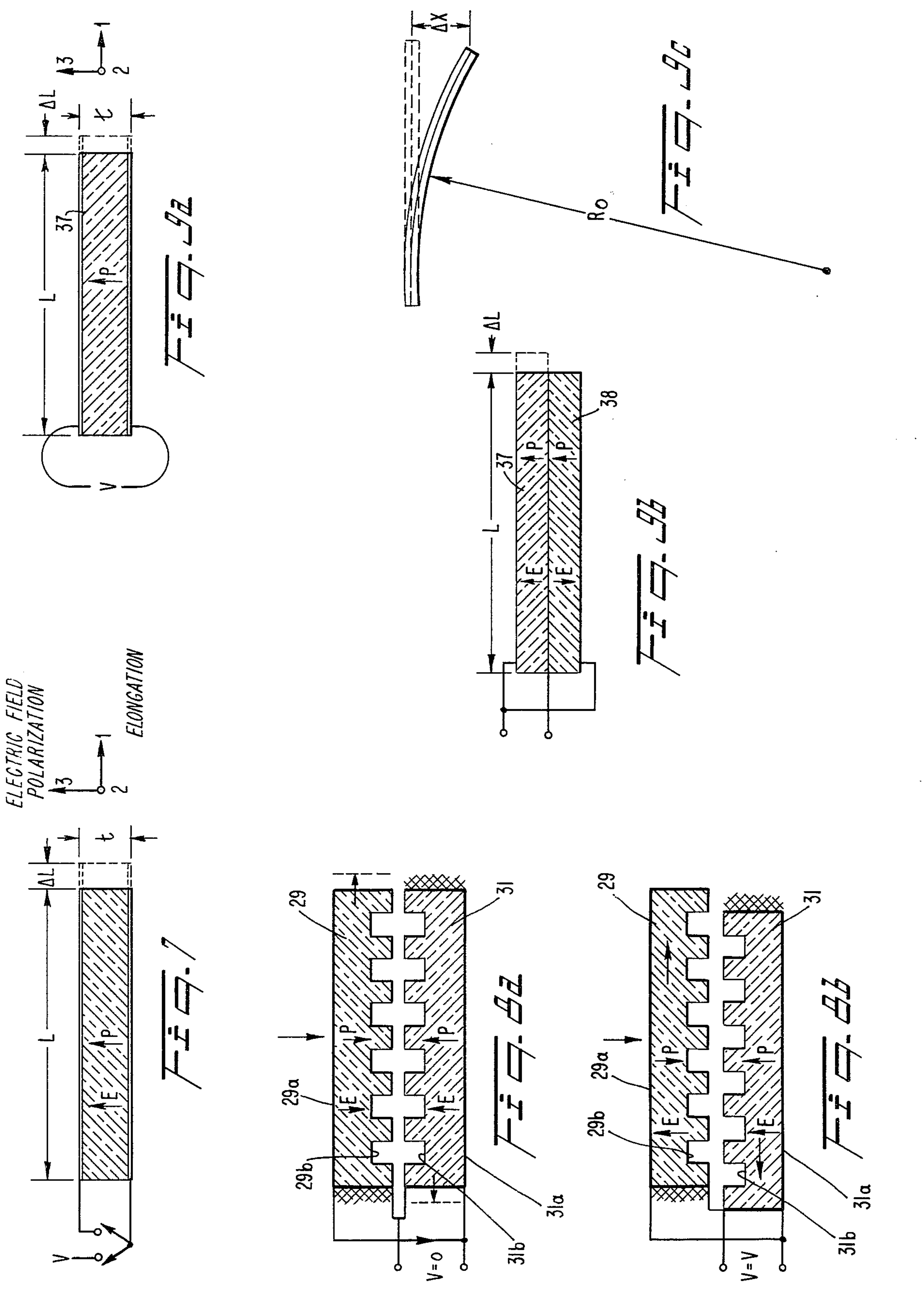
FIG. 7 is a schematic useful in discussing the piezoelectric effects of $PVF_2$.

The main property of the $PVF_2$ films which is of interest here, is its elongation or strain (in the direction of prestretching) resulting from the application of an electric field E causing a change in polarization P across the film of thickness t and length L (See FIG. 7). The strain is proportional to the field.

$$S = \frac{\Delta L}{L} = d_{31}E = d_{31}\frac{V}{t} \quad (3)$$

Where t is thickness, $d_{31}$ is the piezoelectric constant for the film with response along axis 1 to field E along axis 3 (See FIG. 7), and V is the voltage applied to provide the field E. A typical value of the piezoelectric constant $d_{31}$ for $PVF_2$ is $d_{31}=3\times10^{-9}$ cm/volt. Hence a strip one mm long, 10 μm thick will elongate 0.35 μm for 116 volts. An elongation of 0.35 μm is sufficient for valve action with a grating periodicity D=1.4 μm and amplitude $d_0$.

This example shows that a bigrate could be made from available 10 μm $PVF_2$ films embossed with gratings of periodicity of 1.4 μm that has been achieved, as long as a control voltage of more than 100 volts is acceptable. A way to build a bigrate is as follows.

(b) Light valve with expanding gratings

The light valve can be constructed as is illustrated in FIG. 8*a*. Two piezoelectric strips with embossed diffraction gratings of the same periodicity and amplitude c or depth are juxtaposed with gratings facing each other and grating lines parallel. One is anchored at one end and the other is anchored at the other end. The strips 29, 31 are coated with semi-transparent conductive electrodes 29*a*, 29*b* and 31*a*, respectively. Voltages are applied, as indicated, across the strips (See FIG. 8*b*) which causes both strips to expand. The expansion is linear along the strips. Thus the expansion of the strips is equivalent to a shift between them, the shift being produced by one strip at one end and by the other strip on the other end. The shift at any location between the two ends results from the added motions of the two strips. That shift is the same along the whole length of the strip since the motion of one strip increases while that of the other decreases as one moves along the length of the strips. In other words, by anchoring the strips at opposite ends the linear expansion along the strips is equivalent to the shift of non-expanding strips one with respect to the other.

Such bigrates made of two piezoelectrically expanding $PVF_2$ films can be useful in many applications. While based on mechanical motion they are essentially "electronic" since the motion is so small and their action or response is very fast, as is explained below. They could be used as a nonmechanical shutter in cameras, for example.

(c) Array of light valves for Flat TV Displays

An x-y array of light valves uniformly illuminated can produce images. The images can be characters that require relatively low resolution, only on-off black and white modulation and low speed. With more resolution, grey scale, color and higher speeds TV images can be displayed. We will consider the TV application.

For an array to be x-y addressable, that is, addressable by rows and columns, it is necessary that the addressing of a given row and a given column influence the element at their intersection but leave unaffected the other elements on that row and that column. As is well known, in electrically driven arrays, such as core memory arrays or electroluminescent displays, a sufficient non-linear relation between the state of the element (magnetization or light intensity) and its electrical drive is necessary to obtain such coincidence addressing. For a light valve display (as well as a core memory plane) it is desirable also that the addressing of a given valve leave that valve in its set condition until changed by a new addressing. Without that storing or memory feature only addressed or scanned elements would transmit light, hence the display would be very dim.

The bigrate made of a sandwich of two expanding films described above has a linear response to the applied voltage across the film and no storage properties, as long as the voltage is relatively small. It turns out, however, that for larger voltages $PVF_2$ films exhibit hysteresis properties. In fact the strain (relative elongation) plotted versus polarization shows up in a hysteresis loop resembling that of magnetic materials. Hence there are both non-linear response and remanent states. Unfortunately the loop is not very "square", though possibly just sufficiently so as to be useable. However, the level of the required excitation is very high, the necessary electric field being more than half of the field producing breakdown of the film. For TV applications the high addressing voltages and the lack of sufficient breakdown safety margin make the use of such expanding-film light valves undesirable.

Fortunately, there is another way to utilize an array of bigrates for displaying TV images.

4. Flat TV Display Made From a Matrix of Bigrates (a) Bimorph films

A device using two or more layers (such as 37 of FIG. 9*a*) of polyvinylidene fluoride ($PVF_2$) bound together has remarkable properties which have been recently described by M. Toda and S. Osaka[3]. In its simplest form such a "bimorph" device consists in two bonded films that are so polarized and energized as to produce an elongation in one film and a contraction in the other. (See FIG. 9*b*) In one film 37 the electric field E is in the same direction as the remanent polarization P and in the other 38 it has the opposite direction. The result is a bending of the bimorph, in response to applied voltage, which is somewhat similar to the bending of a bimettalic strip resulting from differential thermal expansion. The radius of curvature $R_0$ and the displacement Δy of one end of the bimorph when the other is clamped (See FIG. 9*c*) can be shown to be $$R_o = \tfrac{2}{3} \cdot t^2/V \cdot 1/d_{31} \quad (4)$$

and $$\Delta y = \frac{L^2}{2R_o} = \tfrac{3}{4} \cdot V \cdot d_{31}\left(\frac{L}{t}\right)^2 \quad (5)$$

L and t are the length and thickness of the bimorph. It is apparent from (5) that the motion Δy is (3L/4t) greater than the linear elongation. For example for a 1 mm long strip 10 μm thick, it is 75 times greater. Hence, only one or two volts are sufficient to produce the submicron shift necessary for bigrate operation, as will be seen.

(b) Bigrate with grating moved by bimorphs

Figures 10A, 10B:
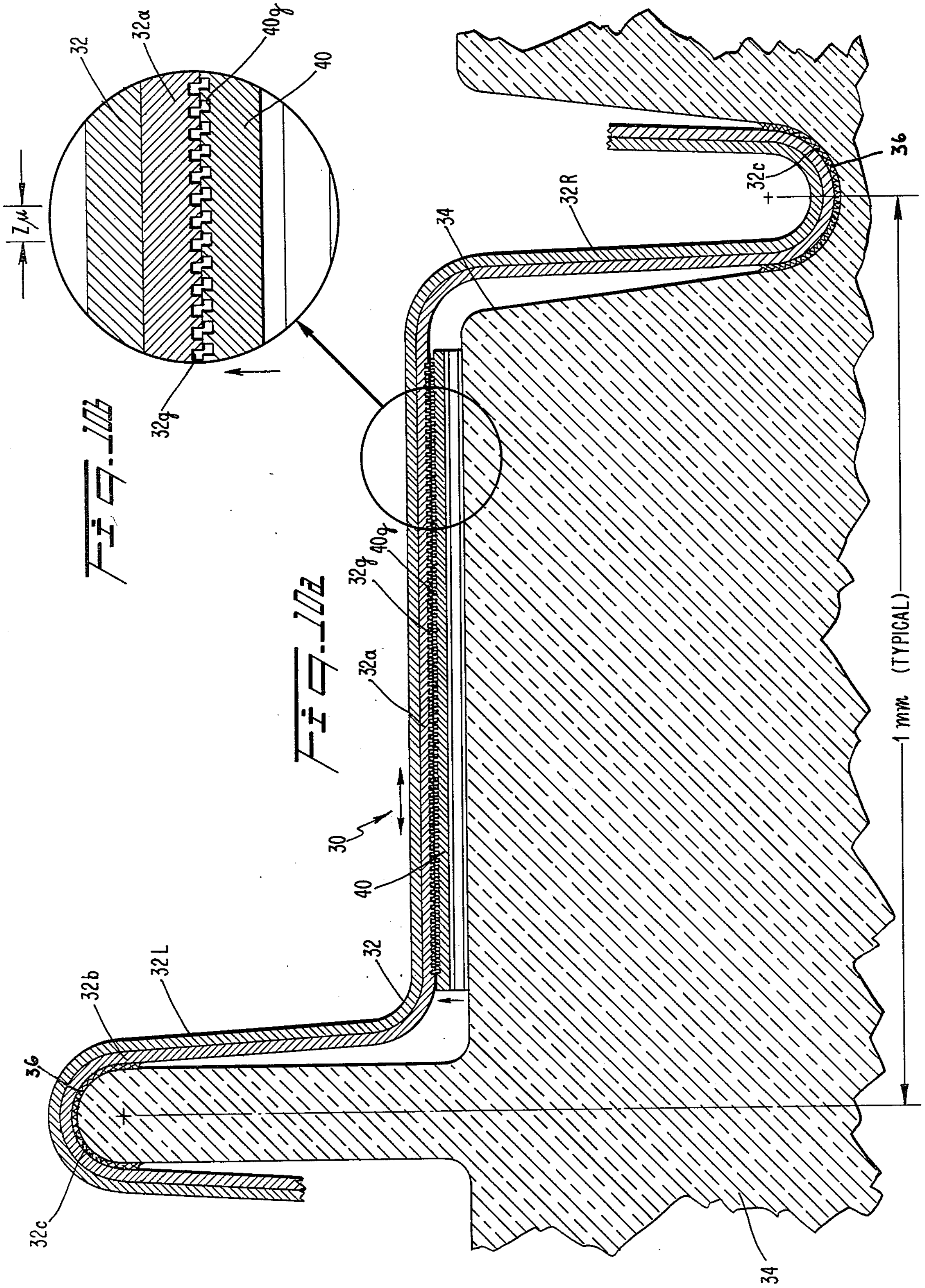
FIG. 10 illustrates in the partial cross-sectional view of FIG. 10*a* a bigrate actuated by looped or serpentine bending arms or bi-morphs and in the cross-sectional view of FIG. 10*b* an enlarged small portion of FIG. 10*a;*

A structure utilizing the enhanced motion due to bimorphs and one which is suitable for an element of an image display array is shown in partial longitudinal cross-sectional view in FIG. 10. The vertical or column lines 30 of the array consist in bimorph strips 32 that have been bent into a serpentine shape. The bending is made so as to provide straight portions alternating with U bends 32*b*. The U bends are alternately on one side or the other of the strip straight portions 32*a* of the strip 32, i.e. alternately inverted as shown. A diffraction grating 32*g* is embossed on the straight segments 32*a* (and can also be embossed on the entire length of the strip 32). The serpentine strip 32 is anchored at the distal tips or ends 32*c* of the U bends to a transparent supporting plate or matrix 34 by any suitable bonding material 36.

When a voltage is applied across the two layers of the bimorph by transparent conductive electrodes (not shown in FIG. 10), one expands and the other contracts, as has been explained. This causes the arms of the U bends to bend. This bending causes the straight part to be shifted or translated. With the alternate up and down positioning of the U bends, the bending of the arms on either side of a straight segment tends to move that segment in the same direction when a given polarity voltage is applied across the whole length of the strip. For example, if the inner layer carrying the grating expands and the outer layer contracts, both left and right arms 32L and 32R as viewed in FIG. 10 move to the right. Of course, with opposite polarity the shift would be to the left.

Assuming the length of the arms to be 0.55 mm and the thickness of each layer in the bimorph to be 10 $\mu$m, then a voltage of only 10 volts will produce a shift of 0.7 $\mu$m. Therefore, full on-off light control is obtained if the grating periodicity is 1.4 $\mu$m and the amplitude of the grating is $d_0/2$, as explained above.

The vertical or column strips 32 are bimorphs with an anisotropy created by stretching the strips along their length. The embossed grating lines are perpendicular to the length of the strips.

(c) Horizontal lines

Figure 11A:
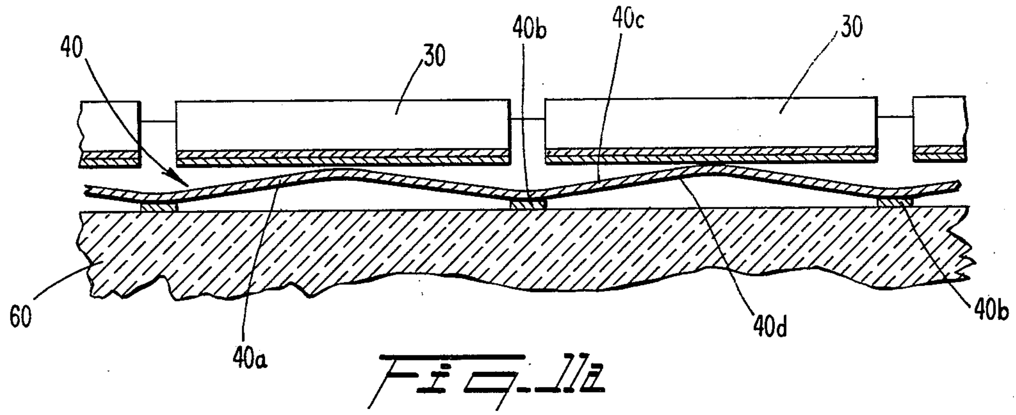
FIGS. 11*a* and 11*b* illustrates in partial cross-sectional views how a selected bigrate may be positioned and thereafter locked into position, FIG. 11*a* illustrating the locked position and FIG. 11*b* the unlocked position for selecting the desired light transmitting position of the bigrate.
Figure 11B:
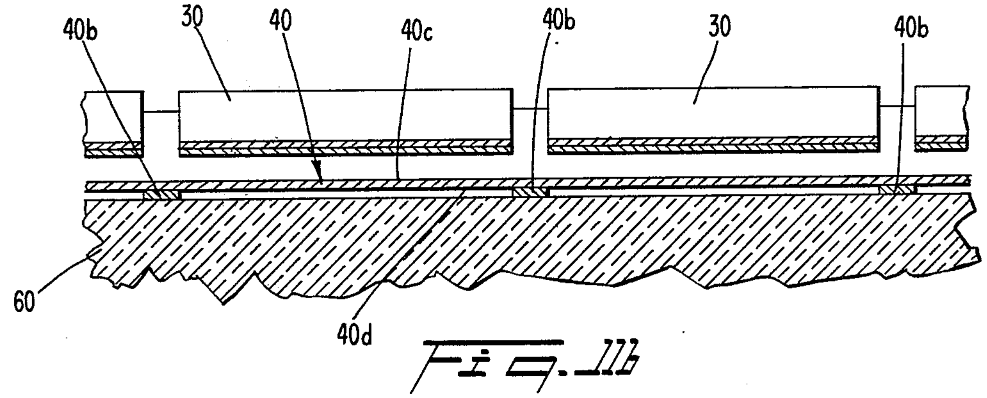

The horizontal lines 40 are shown in the vertical cross section of FIG. 10 and also in the horizontal cross-sectional views of FIGS. 11*a* and 11*b* and are made also of $PVF_2$ plastic. They are simple strips, not bimorphs. Their direction of anisotropy is also obtained by stretching their length. They are embossed with a diffraction grating 40 g as shown in FIG. 10 whose lines are parallel to the length of the strip and therefore do not appear in FIG. 11. The horizontal lines are bent in a gentle serpentine manner that produces a succession of arches 40*a* as is shown (exaggerated) in FIG. 11. They are anchored to the support or matrix 34 at intervals, as at 40*b* at the boundaries between adjacent vertical lines by any suitable bonding material. Hence there is an "arch" underneath each vertical straight line segment. (See FIGS. 10, 11 and 13).

When a voltage is applied across the horizontal lines 40 (also coated with transparent conductive electrodes 40*c* and 40*d* on opposed surfaces) every arch lengthens or contracts depending on the polarity of the voltage. Hence the arched strip rises or falls. It is this effect which is utilized to make earphones and small loudspeakers in what is the best known commercial application of $PVF_2$ films. The rise (or fall) at the center of the arch is much greater than the elongation (or contraction) of the strip. In effect the "anchored arch" provides mechanical amplification. The anchored arch and the bimorph are two ways to obtain mechanical amplification.

The horizontal strips 40 have two functions. One is to provide the grating 40*g* to face the grating 32 *g* of the vertical lines. The gratings 40*g* do not move in any material way in the direction perpendicular to the grating lines. The other function, as shall now be explained, is to brake or lock the vertical strip against motion in the direction perpendicular to the grating lines. This second function is accomplished by expanding a horizontal strip 40 so that it presses each vertical segment in a horizontal line against the support or matrix 34.

By applying the appropriate voltage on a horizontal line 40 it is possible to cause all the arches of that horizontal line to press against the vertical strips as in FIG. 11*a*, i.e. all the horizontally aligned segments of each vertical strip, or else to cause them to collapse against the supporting board so that they clear completely the horizontally aligned vertical line segments, as in FIG. 11*b*. In a preferred arrangement the preformed strips press against the vertical strips when no voltage is applied to them. When a voltage is applied to a selected horizontal line, its contraction causes all arches to fall and clear all the vertical lines. On the other hand, all the other arches pressing on the vertical do so with enough strength so as to prevent any motion of these strips.

(d) Operation of an array of bigrates

In operation, all horizontal lines or strips 40 press against the vertical strips or lines 30 except one, the one being selected or scanned, as was just explained. Video signals are applied to all vertical lines 30 simultaneously according to the well known line-at-a-time addressing system which has been used in various types of displays.

In a TV display based on a matrix of discrete elements addressed by rows and columns it is possible to simultaneously set all the elements of a given row or horizontal line rather than to set them sequentially as is the case with the conventional scanning of a cathode-very tube. This is the line-at-a-time TV system utilized in various matrix arrangements such as electroluminescent, liquid crystal and electrophoretic displays.

For each column there may be provided, for example, (1) first and second circuits capable of storing the video signals (2) several switches. First the video signal is sequentially switched to the first circuits by means of a shift register (or counters), shifting at a rate synchronized with the horizontal scan of the received TV signal. During that horizontal line time each second circuit is energizing its column at the previously set video level. Next, the video signal is sequentially switched to the second circuit while the first circuits activate the columns. The operation is repeated indefinitely.

One example of a "line-at-a-time" TV system is described in an article by B. J. Lechner et al entitled "Liquid Crystal Matrix Display", Proc. I.E.E.E., Vol. 57, November, 1971, pp. 1566–1579.

At each column on the selected horizontal line 40 the bigrate element which is free to move will move by a distance determined by the video signal. At some time during the standard TV horizontal scan period (63.5 $\mu$sec), each element on the line 40 will have reached a position proportional to its video signal. At that time the selected horizontal line 40 is deenergized and therefore presses against all the vertical columns. Hence the shifting straight line elements controlling the light transmission in each bigrate is immobilized to the right setting. It cannot move when other lines are selected.

The braking action of the horizontal line produces effective storage of the video, by causing the position of the control element to be "stored". This "mechanical" storage is to be contrasted with the electrical charge storage used in most x-y addressed systems. Additionally the braking action permits x-y or row-column addressing, since it provides a means to address elements on a given row, according to signals on the columns, without affecting in any way any element on the other rows. There are no "disturbs" due to partially selected elements as is the case with coincident electric addressing.

The image of a frame can be frozen or stored by removing energization from the horizontal lines. The image will appear as long as there is illumination. Even if illumination is removed, a latent image will be stored visibly when illumination is restored.

5. Computation of Motions, Times Forces and Drives (a) General

The following analysis and computations give the general relations governing the operation of the bigrate matrix display described above. A particular example is chosen to show that the motions of the vertical and horizontal strips are fast enough and accurate enough and also that the braking forces are adequate to obtain a TV display.

(b) Motion of the vertical strips

The straight segment 32a (FIG. 10) in each element is the light-controlling element of the bigrate. This segment is suspended between two arms 32L and 32R. When not braked the segment is free to swing together with its arms. The natural frequency of that swing can be computed from the restoring force $F_s$ (so-called even though the element may never have been at, or may never reach, the null force or equilibrium position) due to the elasticity of the two supporting arms and from the effective mass. According to elasticity theory applied to "anchored" arms, as the arms of the elements really are, the displacement $\Delta y$ of the tip of an arm (free end of the U) due to a force F is given by:

$$\Delta y = \frac{4L_a^3}{ywh^3} \quad (6)$$

In this expression L, w, and h are respectively the length, width and thickness of the strip in cm, F is in dynes and Y is Young's elasticity constant in dynes/cm$^2$. For $PVF_2$ $$Y = 2.25 \times 10^{10} \text{ dynes/cm}^2 \quad (7)$$

Solving (6) for the force and not forgetting that there are two arms gives the restoring force $F_s$ as a function of the displacement $\Delta y$ $$F_s = \Delta y \frac{ywh^3}{2L_a^3} \quad (8)$$

The effective mass m, is that of the straight segment 32a plus about half the mass of the two arms 32L and 32R (since the center of mass of an arm moves only half as much as the tip).

Hence the equation of motion is (since damping is very small)

$$m\frac{d^2y}{dt^2} = -y\frac{ywh^3}{2L_a^3} \quad (9)$$

and the natural period of oscillation $T_v$ is $$T_v = 2\pi\sqrt{\frac{2mL_a^3}{ywt^3}} \quad (10)$$

For $L_a = 0.55$ mm, $t = 20$ μm (two strips of 10 μm bonded together) $w = 1$ mm and $m = 6.2 \times 10^{-5}$ gr ($PVF_2$ density 2, width 1 mm, length of straight segment 1 mm and arm lengths 0.55 mm), the natural period $T_v$ turns out to be $$T_v = 212 \text{ microseconds} \quad (11)$$

The motion of the segment, starting from an arbitrary initial position, determined from a previous setting, due to the present values of the video signal can be found by observing the following. The effect of applying a voltage on a bimorph strip is to displace the position of equilibrium $y_0$ around which the strip oscillates. In effect, the application of the voltage creates a new "spring" whose rest position is displaced by $y_0$ with respect to the position corresponding to no applied voltage. Its stiffness in the new state remains unaffected. The displacement $y_0$ is proportional to the applied voltage according to equation (5).

Consider now an element that has been immobilized at some initial location $y_i$. When released at time $t_1$ (See FIG. 14a) the element will start to oscillate around the new position $y_n$ determined by the video voltage. The element will therefore reach position $y_n$ precisely at time $t_1 + T_v/4$. The element will reach that position at that time regardless of where the initial and final positions are. The motion of the element is similar to that of a simple pendulum in which the period (and hence the quarter period) is independent of amplitude. In our example 53 μm after the element is freed, it will reach the desired final location determined by the video signal. At that instant, $t_1 + T_v/4$, the element is immobilized by a sudden braking action of the horizontal line.

(c) Motion of the horizontal strip

Consider now the motion of an "arch" on the horizontal line. The displacement $\Delta x$ (See FIG. 12b) of its center due to an applied force F is given by elasticity theory and is $$\Delta x = \frac{F}{16} \cdot \frac{1}{yw} \cdot \left(\frac{L}{t}\right)^3 \quad (12)$$

When free the arch will oscillate around an equilibrium position determined by the voltage applied to the horizontal strip in a manner similar to that explained for the vertical element. The natural period of oscillations $T_H$, may be computed and is $$T_H = 2\pi\sqrt{\frac{mL_H^3}{16wyt_H^3}} \quad (13)$$

where m is half the mass of the arch, w the width, $t_H$ the thickness, and $L_H$ the length of a horizontal line segment. In our example we will assume that the horizontal line, though single layered, is 20 μm thick, that w=1 mm, $L_H$=1 mm. Hence m2×$10^{-5}$ grs. and the period turns out to be:

$T_H$=52 microseconds.

Actually the horizontal "arch" moves between two "blocked" positions. It presses against the vertical lines for no applied voltage and it presses against the supporting plate when a voltage $V_H$ is applied. These restrictions on the motion of the arch are considered below.

(d) Scheduling within one horizontal line time H

Consider now what happens to the vertical controlling elements on the selected horizontal line during the horizontal line time H. (See FIG. 14). On all horizontal lines other than the selected one, the horizontal strips are pressing on the vertical strips, and it is in that condition that the selected horizontal line is found at the beginning of a selection period H and must be left at the end of H. At the beginning of H each element is at some location $y_i$ and at the end it should be a location $y_n$ determined by the video signal corresponding to its vertical line. On FIG. 14 the full line 50 shows the maximum possible displacement $y_{max}$ from off (no light) to on (full light) or vice-versa. The maximum displacement in our example is 0.7 μm, assuming a grating periodicity of 1.4 μm. The dotted line 52 shows the absolute value of displacement of an element from one "grey" position to another. An element found already in its desired position does not move and its position is represented along the t (time) axis.

When the voltage $V_H$ is applied, the vertical strips are freed. The precise time $t_1$ of freeing is determined by the details of pressure and static friction considered later. For illustration $t_1$ is assumed in our example to be 3 μsec after $V_H$ has reached its nominal "freeing" value. At $t_1$ every vertical strip (except those already in the desired position) starts to move and at $t_1+T_V/4$ each vertical strip reaches its final position. In our example this is 53 μsec. after $t_1$. It takes the horizontal strip exactly $T_H/4$ to reach the vertical strip from its rest position. This time is independent of the exact initial position (as A or B on FIG. 14) since the strip is moving in a simple harmonic motion. Hence if it is started at time $t_2$ that is $T_H/4$ or 13 μsec in our example before the instant $t_1+T_v/4$, it is guaranteed to reach the vertical strip at that instant.

The motions of the vertical and horizontal strips of our example are seen to be fast enough for TV operation. Actually it suffices that a quarter of the period of the vertical strips be somewhat less than the H (horizontal) line time. This is because the vertical strips start to move almost immediately on the onset of the horizontal line selecting voltage and because the excursion of the brake-acting arches occurs within the period of movement of the vertical strips.

(e) Forces

Consider now the pressing forces, the braking forces and the forces tending to produce motion.

The pressing force which a piezoelectrically activated strip exerts on a fixed obstacle is computed by first computing the displacement of the strip that would be present without the obstacle and then computing, on the basis of elastic properties, what force would be required to produce that displacement.

Figure 12A:
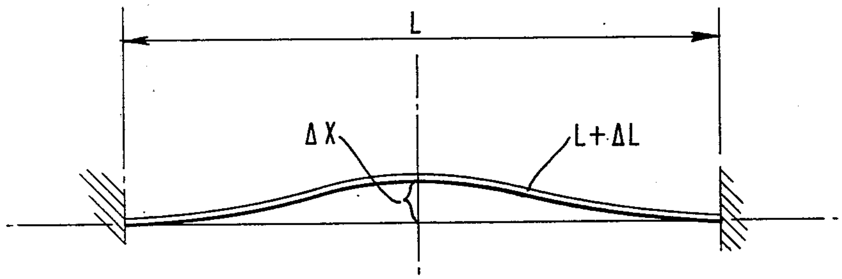
FIG. 12 comprises FIGS. 12*a* and 12*b* which are highly schematic line drawings useful in explaining the operation of the locking strips.
Figure 12B:
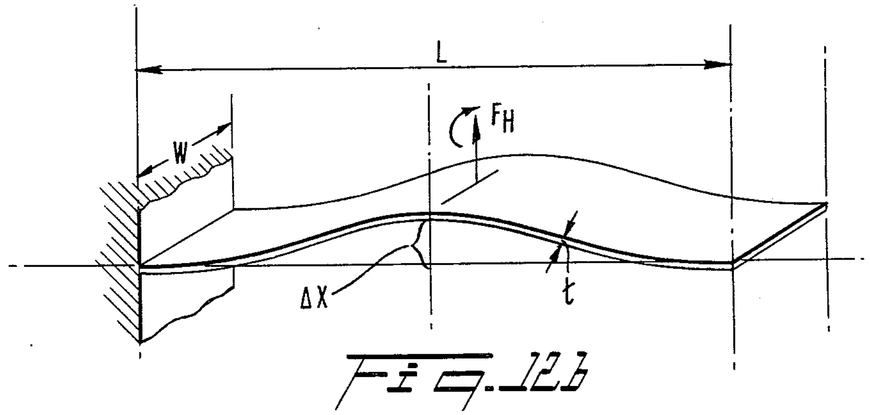

In the case of an "anchored" arch, the free displacement Δx of its center due to the elongation of the arch from L to L+ΔL can easily be computed (See FIG. 12*a*). It is:

$$\Delta x = L\sqrt{\frac{\Delta L}{2L}} \tag{14}$$

ignoring the term $\Delta L^2/4$ which is so small compared to the remaining term that it may be neglected. Hence when a voltage V is applied across the strip, the free displacement is (combining eq. 3 and eq. 14):

$$\Delta x = L\sqrt{\frac{\Delta L}{2L}} = L\sqrt{\tfrac{1}{2}\, d_{31}\, V/t} \tag{15}$$

Hence an arch 1 mm long, 20 μm thick made of $PVF_2$ with a piezoelectric coefficient $d_{31}=3\times10^{-9}$ cm/volt will move $x$=4 μm for an assummed driving voltage of 20 volts.

Elastic theory relates the displacement of the center of an anchored arch to the applied force as per equation (12). Solving (12) for F and substituting the value of Δx according to (15), yields:

$$F_H = 16\sqrt{\tfrac{1}{2}\, d_{31}\, V/t}\; Y\cdot w(t/L)^3 \tag{16}$$

In our example L=1 mm t=20 μm, V=20 volts, w=1 mm. The force turns out to be $$F_H = 115 \text{ dynes} \tag{17}$$

Of course the "obstacle" encountered by the horizontal arches are the vertical strips. Since these are made of a plastic similar to the one from which the arches are made one could ask whether the obstacle yields and hence the force is smaller. Actually the horizontal arch tends to compress one arm of the vertical element and to stretch the other. Compression and stretching require very much larger foces than bending. Hence the obstacle presented by the vertical strips is effectively a very solid one.

In our case it is desired that with no applied voltage the horizontal arches press against the vertical strips. If performed arches are compressed by Δx in the construction process, there will be a force $F_H$ on all arches. In our example a compression of 4 μm will produce a force of 115 dynes. When 20 volts is applied, the force is reduced to zero, but the arch does not move. In order to clear the vertical strip by 4 μm an additional 20 volts has to be applied. Hence the total horizontal line selecting voltage is 40 volts.

Consider now the braking force $F_T$ tending to oppose the motion of the vertical strip due to the pressing force $F_H$. The braking force is proportional to the pressing force:

$$F_T = f\,F_H \tag{18}$$

where f is the coefficient of friction. That relation is independent of the area of contact, a most fundamental property of friction known since the 17th century. The dynamic coefficient of friction f for two dry plastic surfaces pressing each other is listed in various references. The values listed have a range:

$$0.3<f<0.6 \quad (19)$$

Taking the lower value, the estimated tangential braking force on the vertical strip becomes:

$$F_T=34.5 \text{ dynes} \quad (20)$$

The actual force is greater at the instant of impact of the arch, because, in addition to the static pressing force $F_H$, there must be an impulse force stopping the impact of the arch.

The stopping of the vertical strip by the braking action of the horizontal arch is not instantaneous. Rather, the braking force decelerates the strip from its maximum velocity $y_{max}$ to zero. The equation of motion is:

$$y = -\tfrac{1}{2}\frac{F_T}{m}t^2 + y_{max}\frac{2\pi}{T_V}\cdot t \quad (21)$$

where $y_{max}$ is:

$$y_{max} = y_{max}\frac{2\pi}{T_V} \quad (22)$$

For our example the upper estimates for the braking time $t_b$ and the breaking distance $y_b$ work out to be:

$$t_b=3.7\ \mu\text{sec}\ y_b=0.038\ \mu\text{m} \quad (23)$$

Figures 14A, 14B:
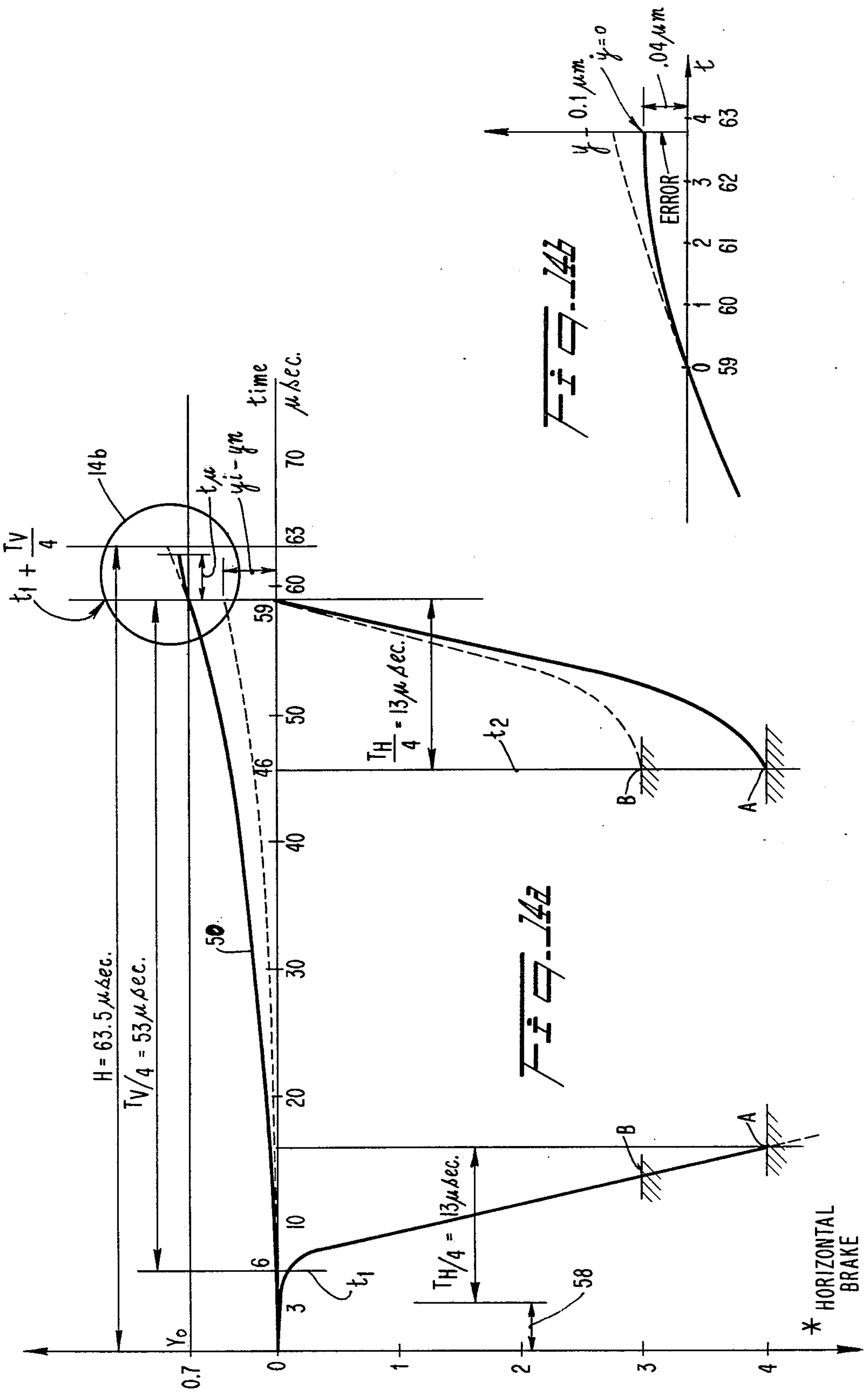
FIG. 14 comprises FIGS. 14*a* and 14*b* which are graphs showing illustrative timing for the motions of the bigrates and the locking strips.

The detail of the trajectory during the braking period is graphed on FIG. 14*b*. These values are for a strip moving the maximum distance (from black to white). The braking distance is proportional to the total distance travelled. On the average it is half the maximum. To compensate for the error due to non-instantaneous braking the horizontal arch can be started $t_b/2$ sooner, i.e. 1.85 μsec sooner.

In any case the error due to the fact that the braking action takes a finite time is seen to be negligible. (The error can be essentially eliminated by two brakings, the first at the nominal time $t_1+T_V/4$ and a second $T_V/4$ later. Of course the period $T_V$ must be less than half the horizontal line time H).

Once the braking force has brought the vertical strip to a position at which its velocity is zero, the strip will remain immobilized in that position, until freed again a frame time later. Indeed the maximum force which tends to move it can be computed from equations (5) and (8).

$$F_s = 3Vd_{31}\,Yw\frac{t}{L_a} \quad (24)$$

Substituting the values for our example (V=10 volt, t=10 μm, $L_a$=0.55 mm and the constants $d_{31}=3\times10^{-9}$ and $Y=2.25\times10^{10}$) the force turns out to be:

$$F_s=3.75 \text{ dynes} \quad (25)$$

This force is almost one order of magnitude smaller than the very low estimate of the braking force estimated on the basis of dynamic friction. Actually the static coefficient of friction is between 1.5 to 3 times greater than the dynamic coefficient. It is apparent therefore that the vertical strips are well immobilized.

The operation may be described qualitatively in more general terms by noting that the element subject to sinusoidal motion as the result of a restoring force is brought to its "rest" position in a quarter cycle. Therefore, by applying a locking force substantially a quarter cycle after the initiation of the force and the commencement of the motion, the object or element will be arrested substantially at its rest position, where no restoring force is applied. If the locking force is removed and a restoring force initiated again toward the same rest position, obviously a closer approach is made to locking the element in the rest position. But whether the so-called restoring force is to the same or different position, as long as it is proportional to the distance from the rest position to provide substantially sinusoidal motion, by locking the element at a quarter cycle after initiation of the force the element is then locked substantially at its zero or rest position. Of course the kinetic energy of the element which is maximum at this position is dissipated by friction.

(d) Drive requirements

In the line-at-a-time system all the vertical lines carry video signals. In our example the maximum signal per line is 10 volts. On the other hand, only the selected horizontal line is energized. In our example the horizontal selecting voltage is 40 volts.

The electrostatic capacity C of the lines can be computed from the relation:

$$C=0.089\ k\ A/d \quad C \text{ in } \mu\mu F \quad A \text{ in cm}^2 \quad d \text{ in cm} \quad (26)$$

In this relation k is the dielectric constant and is equal to 12 for $PVF_2$. Taking the elements to be 1 mm×1 mm and assuming 525 horizontal and 700 vertical lines, the capacities turn out to be:

$$C_v=6000\ \mu\mu F \text{ and } C_h=8000\ \mu\mu F \quad (27)$$

In the case of the vertical lines, $C_v$ can be charged to 10 volts in 3 microseconds with a current of 20 ma, or in 10 microseconds with a current of 6 ma. The scheduling of our example (See FIG. 14) allows a 3 microsecond charging time indicated at 58. Slight shortening of the bimorph lines in the serpentine that would raise the drive requirement to 13 volts would shorten the quarter period of oscillation from 53 to 43 microseconds and hence accommodate easily within the horizontal line time H a charging time of 13 microseconds. The required maximum power per element would then be:

$$6 \text{ ma}\times13 \text{ volts}=78 \text{ miliwatts} \quad (28)$$

or a maximum total power drive on all video lines, for black-and-white, $$78\times700\times10^{-3}=54.6 \text{ watts} \quad (29)$$

In the case of the horizontal line charging 40 volts in one microsecond requires 320 ma. Hence the power is 12.8 watts. The total driving power is therefore:

$$54.6+12.8=67.4 \text{ watts} \quad (30)$$

Figure 13:
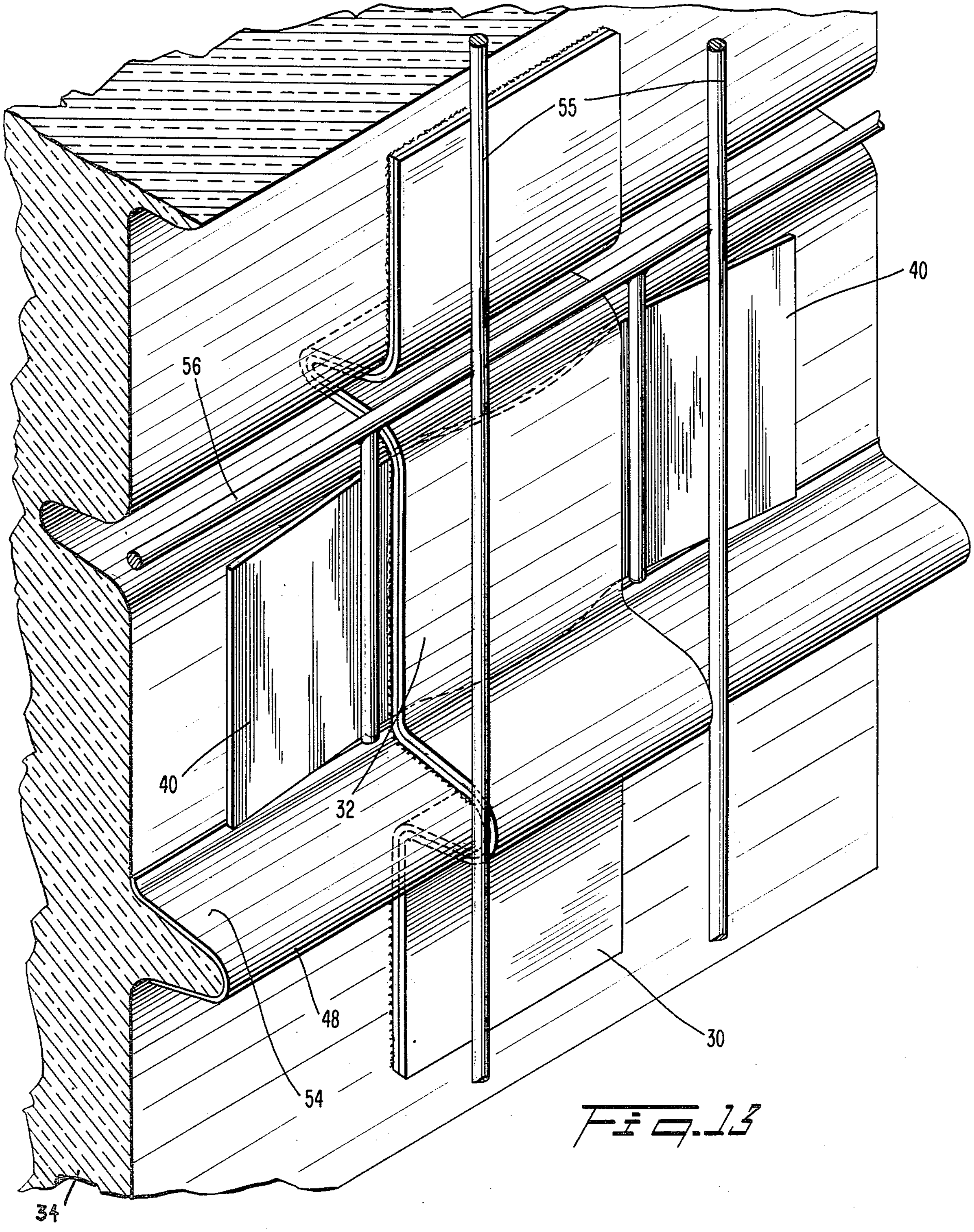
FIG. 13 illustrates in a partial view the assembly of vertical bigrate strips and horizontal locking strips in a matrix.

The thin film transparent electrodes should be made as conductive as possible. It is difficult to obtain films with less than 10 ohms per square. Hence the resistances of the horizontal and vertical lines are at least a few kiloohms. The ohmic voltage drop due to the selecting currents would be too large if these currents had to be carried entirely by the films. Clearly parallel conductive shunting wires are required. Such wires can easily by provided, as is illustrated in FIG. 13.

The shunting conductors can be provided as follows. The ground shunting conductor can be common to the vertical and horizontal strips and it can be provided by a mettalic coating 54 on the outside of the protuberances 48, as shown on FIG. 13. This coating can be thick as it need not be transparent. The vertical line shunts can be wires 55 resting on the protuberances between the V strips. The H shunts can be wires 56 located inside the troughs and suspended by side connectors to the top of the H strips (See FIG. 13).

6. Construction (a) $PVF_2$ strips

As has already been said, the TV display device is constructed from vertical and horizontal $PVF_2$ strips. In our example the strips are 1 mm wide. The vertical strips are bimorph made of two bonded 10 micron strips. The horizontal lines are single 20 micron strips.

Diffraction gratings are embossed on the strips. This is done by means of embossing mettalic masters. Diffraction gratings are made on the masters by photolithography, as described by Gale and Knop.[1,2] Their process utilizes the interference of two phase coherent beams originating from the same laser. The beams strike at an appropriate angle, the master covered with a photoresist. By appropriately modified standard procedures, the desired rectangular or sinusoidal gratings are obtained.

In our case the embossing masters could be the full length of the lines. A simpler, more economical, method is to roll the plastic strips between two rollers, one of which carries the diffraction grating pattern. On the horizontal strips 40 the diffraction lines run parallel to the length of the strip. On the vertical strips 30 the diffraction lines are perpendicular to the length of the strip. (For simplicity, the lines are embossed on the full length, even though they are necessary only at location corresponding to the straight segments of the serpentine.)

The fabrication of the main elements of the TV display is seen to be very simple. The diffraction patterns which are the essential microstructure of the device are fabricated by a continuous process. Strips by the kilometer can be embossed at high speed.

The vertical lines are formed into "serpentines". This can be done by bending the successive humps by means of appropriate jigs. The whole serpentine line is then set on a form, dimensioned exactly as the supporting plate or 34, on which they are heat treated to assume a permanent shape. The diffraction pattern can be embossed prior to this forming as mentioned above. Alternatively, the diffraction pattern can be embossed on the straight segments after the serpentine is formed.

The horizontal lines are similarly preformed into gentle "serpentines" consisting of successive "arches".

(b) Supporting Board

The strips are mounted on a transparent plastic board which has the full size of the display. This board has horizontal grooves alternating with horizonal line or ridges or protuberances 48, as shown for example, in FIG. 13. These features are relatively gross structures of the order of ½ mm and can easily be molded. Thus the transparent board or matrix 34 requires no special technology, as it can be molded by standard techniques.

(c) Assembly of strips with submicron accuracy

The operation of the bigrate light valve is based on the shifting of one diffraction grating with respect to another. For proper operation the two gratings have to be assembled one with respect to the other within the precision of a fraction of the periodicity D. In our example, the periodicity was chosen as 1.4 μm. Hence the precision required is well below one micron. Also the lines of the two gratings have to be parallel. In our example of 1 mm elements, the angular deviation from parallelism should be less than $10^{-4}$ radians.

One way to achieve the required accuracy is to measure the actual relative position of the two gratings and to use the result of that measurement to control that position until perfect positioning is obtained. Then the position is "frozen-in". This feedback procedure is used for each element of the array. In addition to the linear positioning of the strips, a feedback procedure is used to assure that the proper immobilizing pressure is exercised by the horizontal strip on the vertical strip and that the vertical strip can be adequately freed.

One way to fabricate the display with the help of feedback mounting procedures is as follows.

First, the horizontal strips 40 are mounted on a supporting board. The strips, already formed into successive arches, are bonded to the board at locations as at *40b* corresponding to the spacings between vertical lines. (See FIG. 11) Reasonable care is taken to keep the horizontal strips as straight as possible.

Next, the vertical lines 30, already preformed into serpentines, are placed on the supporting board as accurately as is possible. Then the elements of the strip are bonded, one at a time, by means of the feedback mechanism.

The exact position is obtained by using positioning tools consisting of piezoelectric crystals 64, 66 (FIG. 15) with appropriate "hooks" 68, 70 that press against the top of the levering arms of the bimorph vertical strips, as shown in FIG. 15. A voltage applied across the positioning crystal causes the hook to move and thereby moves the arm of the vertical element. In order to obtain perfect parallelism between the grating lines on the horizontal and vertical strips, the vertical strip can be slightly twisted by applying different voltages across the halves of the positioning crystal, i.e. different voltages between electrodes A-B and A-C. There is a positioning crystal for each end of the elements, one in the trough and the other over the proturbance or ridge of the serpentine, as shown in FIG. 15.

The element is illuminated by light, indicated by the arrow 72, and its light transmission is measured by a photocell 74 and sensing circuit (not shown).

The first step is an up and down motion of both piezoelectric crystals. This motion is procedure by an additional piezoelectric crystal that moves the entire assembly of the two positioning crystals (not shown on FIG. 15). An alternating voltage is applied to the vertical strip 30. The vertical strip 30 is moved up and down to a location at which light to the photocell 72 is blocked with no voltage on the horizontal strip 40 and free to move when the selecting voltage is applied. The two conditions are easily detected by observing whether there is or is not a maximum ac component in the photocell circuit.

Next, the element is positioned by the two "hooked" piezoelectric positioning crystals so as to make the light transmission as close to zero as possible. This can be done by first applying the same voltage on electrodes B, C, D and E (electrodes A and F grounded). The result is a pressure on the arms on both ends of the element and a shifting or translation of the element. Then, the element can be twisted by applying different voltages on the two halves of the positioning crystals, for example by connecting B and D and connecting C and E. After twisting, linear positioning can be readjusted. A second twisting may be used. While different sequences can be used, it is clear that four hooks pressing the element at its two ends and two sides can position the element so as to assure perfect linear and angular positions for which the light transmission is zero.

The element is immobilized in the precise position so obtained by bonding the arms 32L and 32R to the supporting plate. The bonding material may be a low melting metal such as lead, tin or some eutectic compound. This material is coated on the sides of the tips of the protuberances 48 and on the side of the bottom of the troughs 49 in the supporting plate or matrix 34, as shown on FIG. 15. To immobilize the element, the bonding material is momentarily melted by means of a very intense laser illumination. The laser light (split to illuminate simultaneously both ends of the element) is adjusted in amplitude and is pulsed for a very short time, e.g. a fraction of a millisecond, so as to provide the exact amount of energy necessary to liquify the bonding material. At the termination of the laser pulse the material solidifies immediately since it is cooled by the adjacent plastic which did not have time to heat-up. Thus, the element is permanently set to the exact position necessary for proper operation of the bigrate light valve.

The positioning of the element by piezoelectric crystals and its immobilization by pulsed laser light are "electronic" operations that take only a fraction of a second. The net fabrication time per element is determined by the much longer time necessary to "mechanically" set the positioning fixture on the element. With appropriate mechanisms, such as combination of an x-y movement of the supporting plate and a z motion of the element-feedback-positioning-mechanism, the setting time could be about one second. Hence, for $525\times700=367{,}500$ elements it would take as many seconds or about 102 hours for the whole array. With parallel testing stations this time can be reduced. For example, with a station every third vertical line, that is $700/3=234$ stations, the feed-back positioning operation for the whole array would take only about half an hour. The frame would be moved one element at a time and this operation would be repeated 3 times. (Incidentally, the laser could be shared between all stations, using a rotating mirror. Much of the testing circuitry could also be shared).

An important feature of the "feedback" positioning fabrication method described above is that the non-transmission state of the bigrate light valves is standardized for the condition of no voltage on the vertical lines. Therefore, good blacks are obtained even if there are some variations in the relation between video signal and resulting transmission, i.e. variation in the "gamma".

(d) Trade-offs between accuracy of construction and operating power

The voltages necessary to operate the bigrate are proportional to the periodicity D of the gratings. Hence the total operating power is proportional to $D^2$. The economy of operation leads to the choice of short periodicities (which incidentally also increase the angle of the diffracted light). In our example we have assumed $D=1.4$ μm and gratings with amplitude $d_0/2$. The required shift is therefore $s=0.7$ μm. Actually the shift can be halved with gratings of amplitude $d_0$ as was explained. In fact any reasonable value for the required shift can be obtained, as the embossing process is not limiting.

The feedback fabrication and laser immobilization method will position the elements with very high but finite accuracy. It is this accuracy which will determine how short the periodicity of the grating can be and hence how economically the display can be operated.

(e) Embossing one diffraction pattern from the other

Another way of obtaining the required accuracy is to preemboss the diffraction pattern only on one of the strips of the bigrate, that is, only on the horizontal or only on the vertical strip. The other strip is coated with a material relatively much softer than $PVF_2$. The vertical and horizontal lines are mounted on the supporting board with care but without excessive accuracy of positioning. Then the strips are pressed one against the other so that diffraction patterns are formed in the soft material. The strips are then loosened, by using vacuum chucks as pressing tools, for example. Matching diffraction patterns are thus guaranteed.

In the non-energized position of all vertical lines, light transmission is maximum in such self-embossed bigrates, since there is precisely a trough in one diffraction grating where there is a peak in the other. Zero light transmission could be obtained for zero video signals on all lines by biasing all lines. Unfortunately slight variations in the piezoelectric coefficient will cause the uniformly biased strips to be set at various levels of grey rather than to black. To avoid this circumstance a "mechanical" biasing can be used, that is, the vertical and horizontal strip can be displaced with respect to one another by precisely half the period of the gratings. This can be done before or after the self-embossing operation.

(f) Black-and-White and Color TV Displays

For a black-and-white display, sinusoidal gratings are used, as was mentioned earlier in connection with the principle of the bigrate. Only a single panel 132 as in FIG. 17 with a set of horizontal and vertical strips is required.

Color is obtained by the superposition of three panels, each made with strips carrying rectangular gratings of the proper amplitude. Knop has shown that amplitudes of 935 nm for cyan, 780 nm for magenta, and 610 nm for yellow provide excellent rendition of natural colors in the microfiche. The same effective amplitudes can be used in the bigrate TV display. Each of the three panels is constructed separately and then the three panels are stacked, as illustrated schematically in FIG. 17 by the three stacks 132, 132A and 132B. Registry is not a problem as it need be only at the level of precision of the elements and not at that of grating lines. Horizontal and vertical circuits 133 and 134 may be provided at the sides of the display as indicated.

Uniform light illumination is provided over the whole array of light valves by any of the various known ways, as for example through many parallel elongated light sources in the focus line of elongated parabolic mirrors or through distributing mirrors.

No additional faceplate is necessary as the back of the supporting plate can be the faceplate by simply orienting it so that the plastic strips face the light source. Obviously a faceplate or suitable enclosure may be used with any embodiment.

A 525×700 line display using one millimeter wide strips would measure about 63 cm×84 cm because the spaces between strips would be about 0.2 mm. It could be from 10 cm to 20 cm deep depending on the particular method of obtaining uniform illumination.

Such a thin box 80 (FIG. 16) could be suspended on a wall 82, providing thus a true "Mural TV". The non-transmitted light 82, 84 is diffracted at an angle $\alpha$ and strikes the ceiling 86 and floor 88 as is shown on the sketch of FIG. 16. The sin $\alpha = x/d$. Hence $\alpha = 21°$ for 500 nm wavelength light and d=1400 nm. There is considerable tolerance in collimation, or angular dispersion, as well as in the location of the observer with respect to the display, as has been explained. The center of the display may be located about 50 inches from the floor at about eye level line 90 for a seated person. For a standing average person eye level line 92 would be about 60 inches from the floor, and the eye level line 94 of a person reclining on a reclining chair. Lines 90, 92, 94 are comfortably in the easy viewing angle for a screen size as suggested.

(g) Discussion of the line fabrication technique

At this point it is of interest to point out the advantages of fabricating an x-y addressed display, or computer memory, for that matter, by lines. One could make the whole device by an unitary integrated process, as is done in integrated circuits. There, the main difficulty is the achievement of perfection, as a single defective element out of $n^2$ in some cases spoils the entire array. In arrays of 16,000, typical yields in integrated circuits are only 10% to 20%. Alternatively, one could make the array by fabricating each element separately and assembling the discrete elements into the array, as is done in core memory arrays. Each element can be pretested to insure perfection. The main disadvantage of that method is its high cost, even when automatic testing and semi-automatic assembly procedures are used.

The fabrication of the array by lines is an optimum method that has the advantage of the economy of integrated fabrication and at the same time the advantages of the pretesting of every element before assembly. In the bigrate TV display construction the $PVF_2$ strips are embossed at high speed and can be optically inspected on the "run". Defective elements can be cut out. As there are only 2n discrete lines to be assembled, the assembly cost is reasonable. Finally, the submicron positioning of every element by a measuring feedback procedure guarantees a successful operation of every element and yet is not an onerous operation when many elements are positioned simultaneously.

(h) Complete Display

To complete the display, a light source and driving circuits have to be added to the matrix of bigrate light valves. The whole display can have the appearance shown in FIG. 17.

A number of parallel elongated light sources 160 backed by a mirror or a number of parabolic mirrors 161 provide uniform illumination. The driving circuits, made of integrated circuit packages, are mounted on the sides of the display. The vertical and horizontal strips can have extra lengths that can be bent in a staggered manner to facilitate connections.

The whole display is light in weight. Its cost should be low, as the bigrates are made of low cost plastics and can be fabricated nearly automatically.

TV DISPLAY DEVICE USING BIGRATE VERTICAL STRIPS AND A HORIZONTAL ROTATING MIRROR

1. Introduction To Device Using Rotating Mirror

A TV display device can be made by using an elongted bigrate light valve at each vertical line and by illuminating the plane of valves on a horizontal line that scans the plane by means of a rotating mirror. The device is operated according to the line-at-a-time system. Each vertical bigrate controls light according to the video signal applied to it.

By resorting to a mechanical motion—the rotation of the mirror—the demands on the light valves are greatly reduced with respect to those used in the purely electronic matrix system described previously. The valves need merely respond to the video signal but do not need to store it. Furthermore the attainment of uniform illumination and adequate collimation is somewhat simpler. While mechanical, the rotating mirror is a very simple and very reliable device.

The main disadvantage of the arangement is that the diplay is not flat, but inherently requires some depth. When this factor is not of major importance, the system provides a simple and economical way of obtaining a large size TV display.

2. Bigrate Vertical Light Valves (a) Principle

Figure 18:
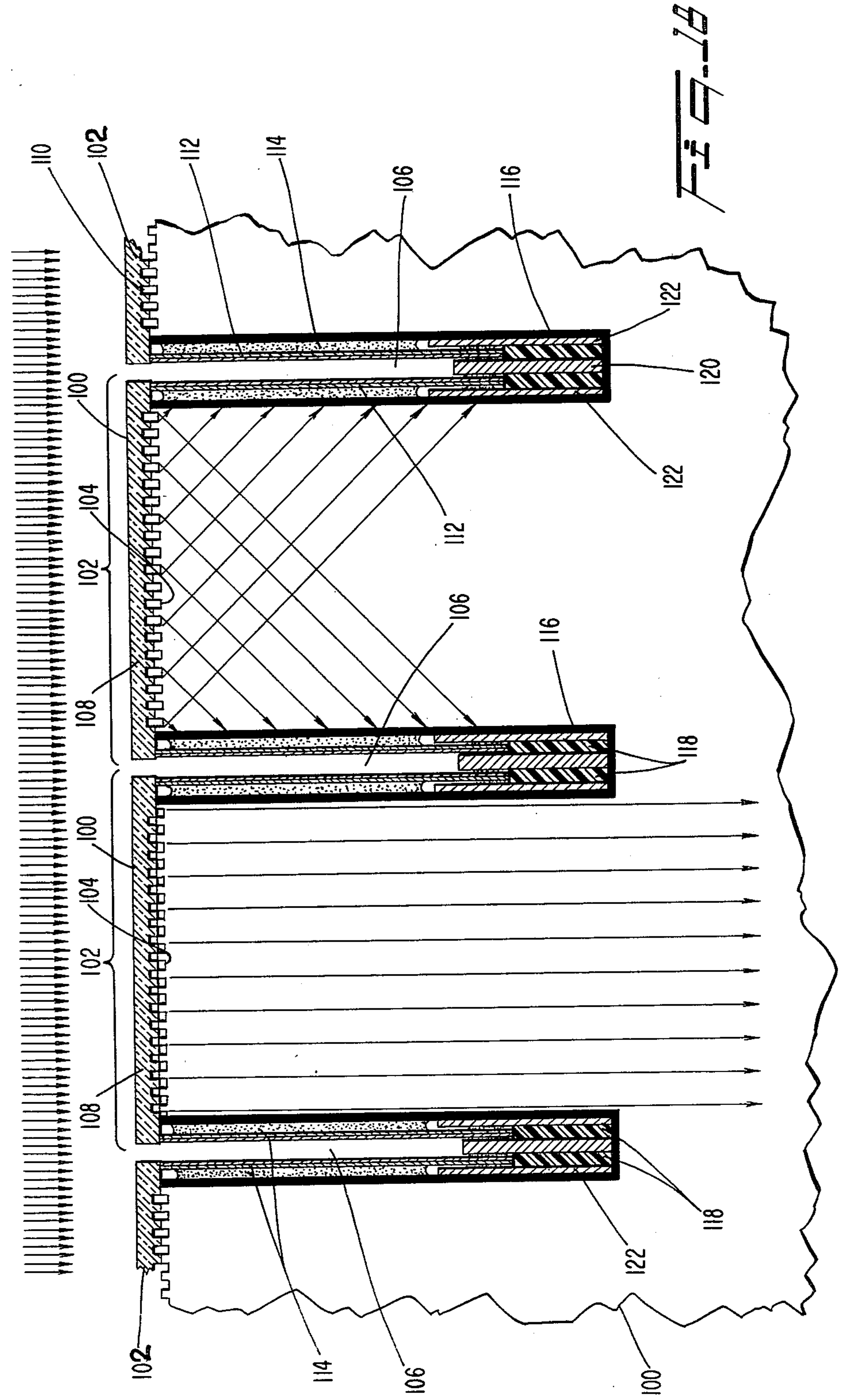
FIGS. 18, 19, and 20 are respectively partial sectional views showing details of an embodiment of the invention employing a diffraction-embossed transparent plastic supporting plate or matrix.

The lines of the two gratings of the bigrates are vertical and the light control action consists in horizontally shifting one grating with respect to the other which is fixed. One way of making the bigrate light valves is illustrated in FIG. 18, which is only partial and is schematic for explanatory purposes, FIG. 19 which is a partial horizontal cross-sectional view, and FIG. 20, a similar cross-sectional view somewhat enlarged. A supporting transparent plastic plate 100 is embossed at each vertical line 102 with a grating 104 running the whole height of the plate. Between the lines 102 are deep grooves 106. Transparent plastic vertical strips 108, embossed with vertical lined grating 110 running their full height, are applied at each location of the supporting plate. These strips 108 are supported on each side by a bimorph strip 112 located in the grooves of the plate. The bimorphs 112 are anchored at the bottom of the grooves 106. Their motion is damped at the top by means of a damping material 114 such as grease or jelly located between them and the walls of the grooves. The two bimorphs 112 supporting a strip are connected in parallel in such polarity of fields E and polarization P to cause the strips 108 to shift in response to an applied voltage.

In operation, video voltages corresponding to a horizontal line are applied to all vertical lines according to the line-at-a-time system. Each vertical line moves and its location is proportional to the driving video signal at every instant. The strips respond to the driving force of the video signals and do not oscillate because their motion is strongly damped.

The FIG. 18 illustrates the control of the bigrates. When the peaks (and troughs) of one grating match the peaks (and troughs) of the other, all light is diffracted and there is no zero order light transmission. The diffracted light strikes the walls of the deep grooves in the supporting plane. These walls are coated with a black light-absorbing material 116, hence there are no reflections, and the strips appear completely black. On the other hand, when the peaks of one grating match the troughs in the other, all light is transmitted. At intermediate positions light transmission is intermediate as was explained.

(b) Drive requirements

In contrast to the all-electronic matrix using free moving control gratings, in the present scanned-illuminating-line system, the motion of the control gratings is strongly damped. Furthermore, the varying video is constantly applied to the bigrates, rather than by sampled pulses as in the former case.

The motion of the moving strip obeys a classical differential equation that equates the sum of the inertial, the elastic and the damping forces to the driving force. In order to obtain the essential conclusion needed, it is not necessary to solve that equation with all the details pertaining to our case. Classical analysis 4 shows that for an external drive of frequency f, the actual amplitude of oscillation is obtainable by multiplying by a factor g, the displacement that would be obtained by a static force equal to the amplitude of the driving force. The plot of the factor g versus f shows first g increasing and becoming very large at resonance (when f is equal to the natural oscillating frequency) and then decays asymptotically to zero. The actual magnitude of g depends on the damping (usually expressed as a multiple of the critical damping). When the driving frequency is several times greater than the natural frequency, the amplification or rather "reduction" factor g does not depend greatly on the damping as long as it is several times greater than critical. For driving frequencies 5 to 10 times greater than the natural frequency, the reduction factor is between $\frac{1}{4}$ and 1/5.

The natural period of free oscillation $T_f$ of the vertical strip can be computed from equation 10. In our example we assume $L_a=1.2$ mm and $t=20$ $\mu$m. The period turns out to be:

$$T_f=815 \text{ microseconds}$$

The highest frequency component of the driving video corresponds to the case of white changing to black or vice-versa from one line to the next. The corresponding period is therefore about 125 microseconds or about six times shorter than the natural period. Hence g is between 0.2 and 0.25.

The displacement of the bimorphs due to a static voltage can be computed from equation (5). In our case it turns out to be:

$$\Delta x=0.324\ \mu\text{m/volt}$$

Hence to obtain an amplitude of oscillation corresponding to a maximum shift of the vertical strip of 0.7 $\mu$m, the required voltage drive amplitude turns out to be from about 9 to 11 volts.

The electrostatic capacity of the two bimorphs is about 12,000 $\mu\mu$F. It must be charged to 10 volts in about 60 microseconds (in contrast to the 3 microseconds required in the pulsed drives in the matrix system). Therefore the required current is about 2 ma, the required power per element is 20 milliwatts and the total power about 14 watts.

Even the small driving current required produces too great an ohmic drop on the lines if it is carried solely by the thin films coated on the bimorphs. Shunting conductors are required.

(c) Construction

Figure 20:
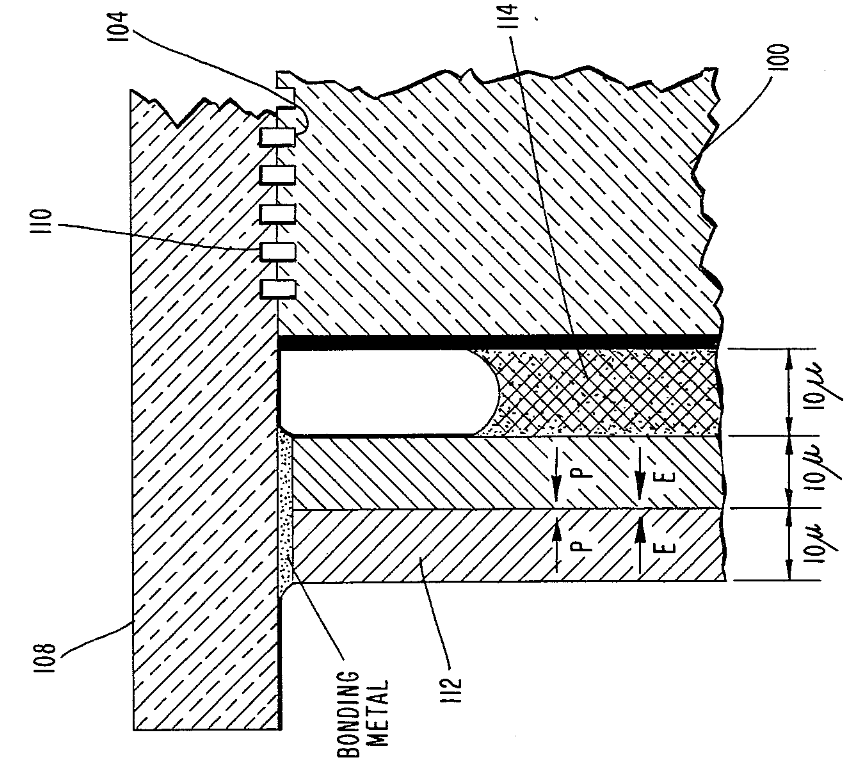
Figure 19:
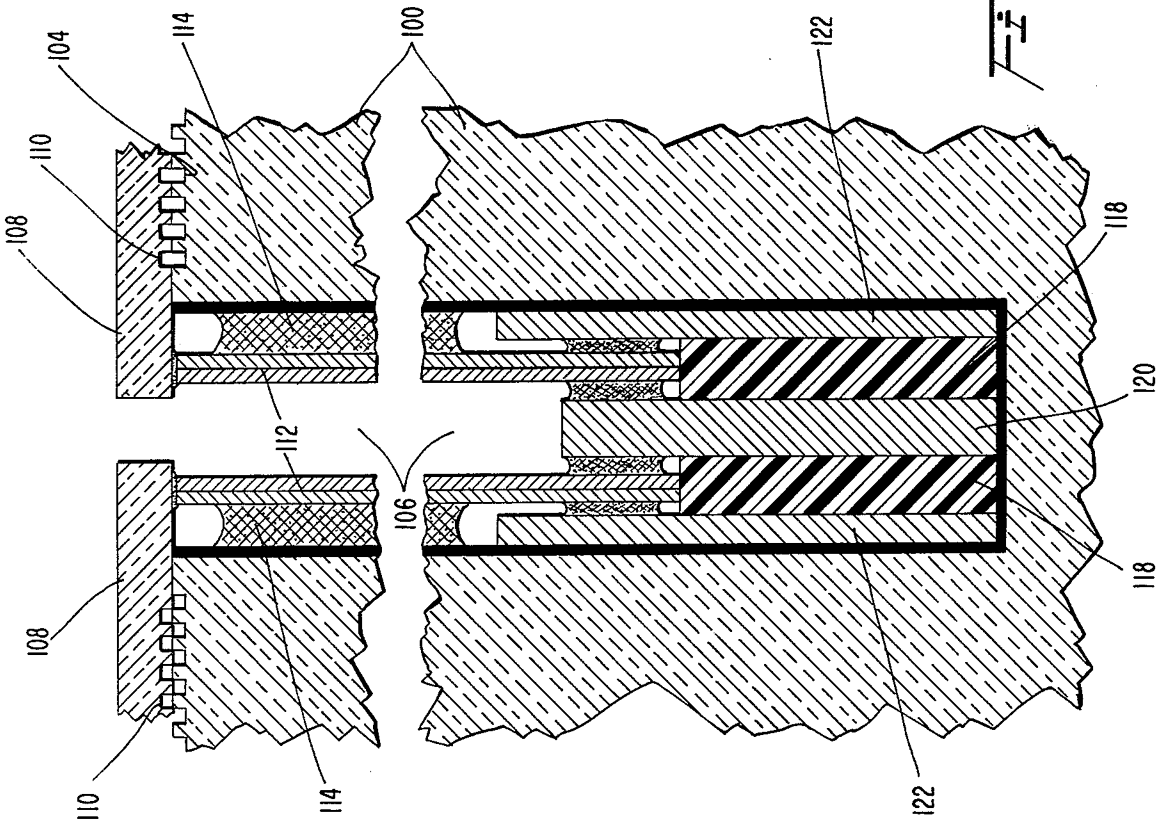

One way to construct the device, illustrated in FIGS. 18, 19 and 20, is as follows.

The supporting plate 100 is made out of transparent plastic and is molded with the deep grooves 106. It is embossed with the diffraction patterns or gratings 104 running between the grooves. The embossing master can be for a single vertical line 102 and the lines 102 can be embossed one at a time.

Each groove contains two bimorphs 122, one for each of its adjacent strips, two spacers 118, a grounding shunt strip 120 and two video shunting strips 122. The contents of the groove can be assembled outside of the groove. They can be stacked into a sandwich which is held by metal bonds between the bimorphs 112 and the shunting strips 120, 122, as detailed in FIG. 19. (The two bimorph layers are polarized oppositely so that only two rather than three connections need be made to the bimorph). Grease, jelly or some other damping material 114 is applied to the upper part of the bimorphs 112 as detailed in FIG. 20.

The long sandwich composite strips thus made, are then inserted in the grooves of the supporting plate. This can be done one strip at a time. The width of the strips is such that the edges of the bimorphs 112 are even with the supporting plate 100. In order to insure that this is so with high accuracy, the grooves 106 are deliberately made somewhat deeper than the widths of the sandwiches. Each sandwich strip fits tightly in the groove and is pushed into it with a tool having a plane bottom so as to insure that the bimorph edge is exactly even with the surface of the embossed supporting plate 100.

Then the vertical strips are bonded to the bimorphs.

(d) Bonding of the strips with submicron precision

Figure 21:
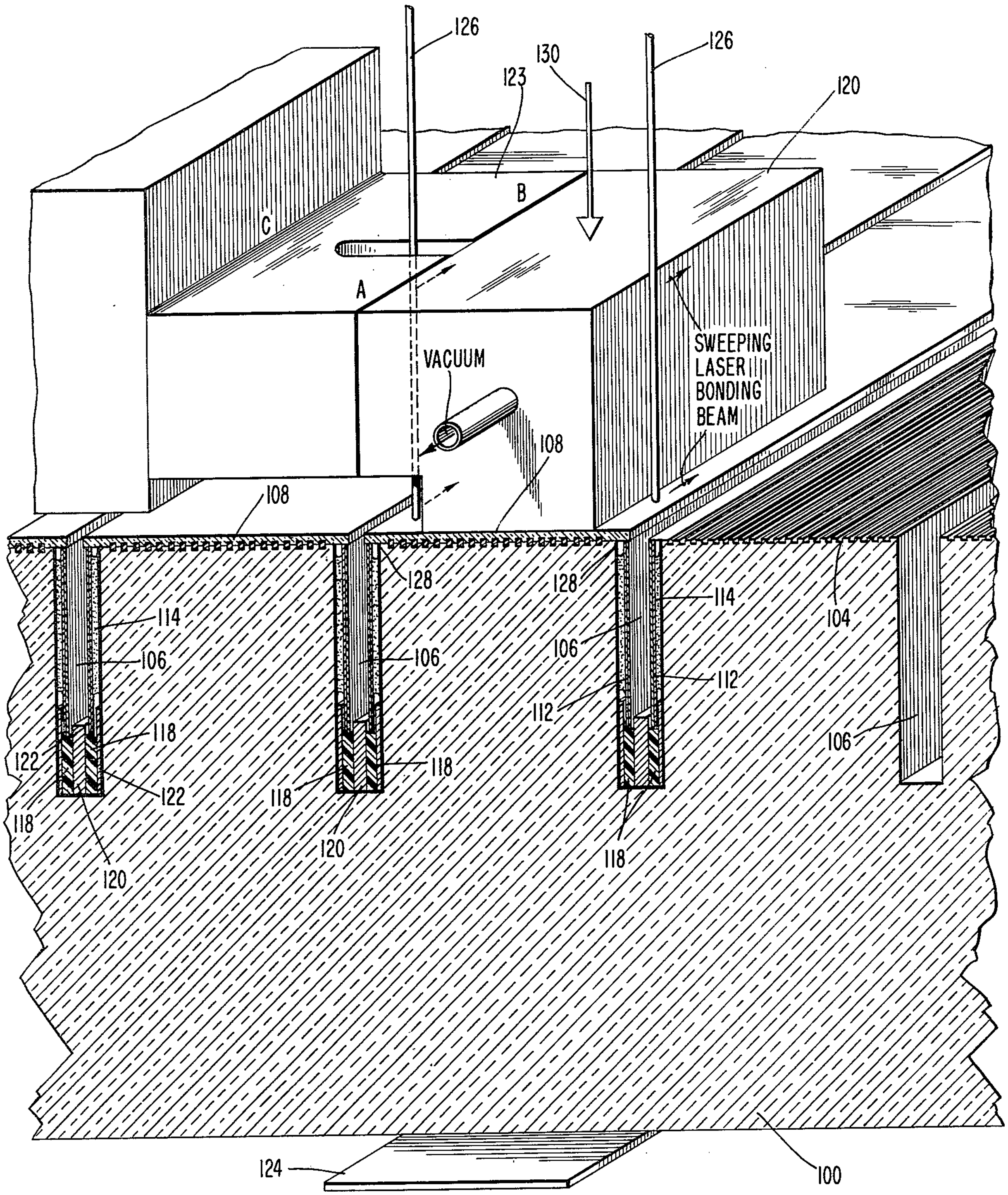
FIG. 21 illustrates a feedback method of initially positioning the strips of a bigrate of FIGS. 18, 19, and 20.

The required submicron precision positioning of the strips with respect to the embossings in the supporting plate can be obtained by a "feedback" method. One way of implementating such a method is illustrated in FIG. 21.

A length of strip corresponding to an element (or longer for that matter) is held by a transparent vacuum chuck 120. The chuck 120 can be translated and twisted (as before by application of voltages to points A, B, and C) by means of two piezoelectric crystals 123 (or a single split one). It can thereby position the element so that transmission of the incident light indicated by the arrow is as close to zero as possible. The light transmission is measured by a photocell 124.

When the elemental length of the strip is precisely located in this manner, it is bonded to its supporting bimorphs 112 which are in their rest, non-energized state at support contact points 128. The bonding is achieved by a melting, light-absorbing material such as lead, tin or an eutectic. The material is liquified momentarily by two narrow laser beams 126 which are directed exactly on the top of the bimorphs. The lasers are pulsed and regulated so that the bonding material liquifies in a very short time. Pencil beams are translated along the element or else fixed ribbon beams (not shown) are used. Immediately at the termination of the illumination by the lasers, the bonding material solidifies as a result of the cooling by the surrounding material which did not have time to warm up.

The vacuum chuck 120 is then loosened and moved to the next element of the strip for the next feed-back positioning and laser bonding operation. Many parallel positioning and bonding heads can be used. As was pointed out in connection with the matrix-bigrate display, the total time required for precision positioning and bonding the elements of an array can be as short as half an hour (344 heads, one second per element).

(e) Alternative construction methods

The vertical strips 108 having embossed gratings 110 carried by bimorphs 122 may be replaced by extending the bimorph $PVF_2$ into an L shape, one arm of which rests in and is anchored in the groove 106 as before. The other arm carries a grating to face the grating 104 on the support plate to cooperate therewith (not illustrated). The arm of that carrying the grating preferably is not stressed or polarized, and one may use only that one bimorph to actuate its desired motion to vary the zero order light transmission in accordance with the electrical signal. The bimorph can be positioned by a feedback and bonding method similar to those previously described.

Also flattened U formed bimorphs can be used for the pair in each groove 106 if different polarizations or energizations are provided for the two legs of the U. (not illustrated)

3. CONSTRUCTION OF THE DISPLAY DEVICE

To complete the display, driving circuits must be provided for the vertical bigrate lines and a means must be provided for scanning with a horizontal line of light.

A rotating elongated multifaced (e.g. 8-faced) mirror 140 can provide the scanning line of light, as shown in FIG. 22*a*. A collimating cylindrical lens 142 of the size of the display can be used to normalize the direction of the illuminating beam, as shown in FIG. 22*a*. An elongated light source 144 may be positioned at the focus of a collimating lens 146 to direct light to the mirror 140.

Alternatively, a Fresnel lens 148 can be used for that function as shown in FIG. 22*b*. The Fresnel lens 148 can be modified so as to convert the uniform angular beam velocity into an uniform linear scanning velocity.

A way to reduce the depth of the device consists in using two multifaced mirrors 150A and 150B rotating at the same speed, as shown in FIG. 22*c*. Every other face of the mirrors is blackened. It is apparent that with this arrangement, after one beam has scanned half the display, the other beam takes over and scans the other half, (while the first beam strikes a blackened facelet). The light from one side of the light source 144 illuminates one mirror and its back the other. Hence, even though half the light is wasted on each rotating mirror, the light efficiency of the system is about the same as that of a single mirror system because in the latter the light from the back of the source is wasted.

For a black-and-white display a single panel with bigrates made of sinusoidal gratings is used. For a color display, three panels are stacked each with bigrates made of appropriate amplitude rectangular gratings as already suggested and as indicated as 132, 132A and 132B, with elements reasonably aligned, as indicated in FIG. 17.

REFERENCES

Figure 6A:
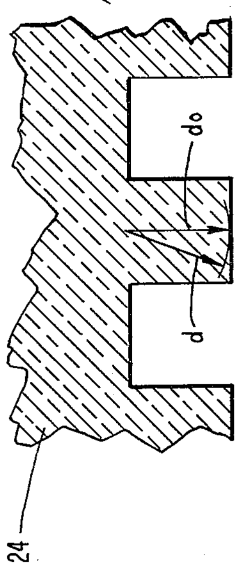
FIG. 6 comprises FIGS. 6*a* and 6*b* which are useful in discussing the effects of deviation from perfect collimation of light incident on a bigrate.
Figure 6B:
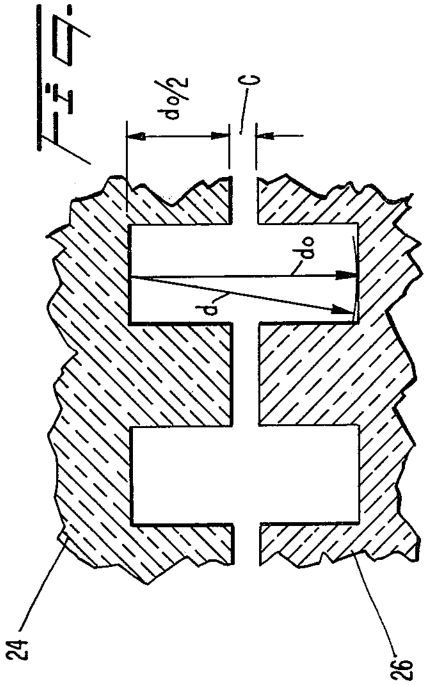

1. K. Knop, "Color Pictures Using the Zero Diffraction Order of Phase Grating Structures", Optics Communications; Vol. 18, No. 3, August, 1976, pp. 298–303.
2. M. T. Gale, "Sinusoidal Relief Gratings for Zero-order Reconstruction of Black-and-White Images", Optics Communications, Vol. 18, No. 3, August, 1976, pp 292–297.
3. M. Toda and S. Osaka, "Electromotional Device Using $PVF_2$ Multilayer Bimorph", Trans. I.E.E.E. Japan Section E (in English), July, 1978.
4. See, For Example: K. N. Tong, "Theory of Mechanical Vibration", Ed. John Wiley, New York (1960), pp. 17–24 and FIG. 6

What is claimed is:

1. A light valve comprising a pair of transparent elements each having a surface portion which has a phase diffraction grating having the same periodicity as, in close juxtaposition to, having grating lines parallel to those of, and facing the like portion of the other.

2. A light valve comprising a pair of transparent elements each having a surface portion which has a phase diffraction grating having the same periodicity as, in close juxtaposition to, and having grating lines parallel to those of the like portion of the other, and means for moving one of said surface portions relative to the other in a direction perpendicular to the grating lines, to thereby vary the zero under diffraction transmission.

3. A light valve as claimed in claim 2, one of said elements comprising an elongated transparent plastic strip, said one surface portion being a portion of said strip.

4. A light valve as claimed in claim 3, said moving means comprising a part of said strip.

5. A light valve as claimed in claim 4, said other element being another elongated transparent strip.

6. A light valve as claimed in claim 5, both said strips consisting essentially of polyvinyldene fluoride ($PVF_2$).

7. A light valve as claimed in claim 3, further comprising a support, said moving means comprising a piezoelectrically responsive lever arm attached to said support.

8. A light valve as claimed in claim 7, said moving means comprising a second piezoelectrically responsive lever arm attached to said support.

9. A light valve as claimed in claim 7, said lever arm including said part of said strip bent to form said arm.

10. A light valve as claimed in claim 9, said moving means comprising the second piezoelectrically responsive lever arm including another part of said strip bent to form said second arm, the motion of said arms aiding.

11. A light valve as claimed in claim 7, said lever arm being a bimorph strip.

12. A light valve as claimed in claim 8, both of said lever arms being bimorph strips.

13. A light valve as claimed in claim 2, each of said gratings having an amplitude corresponding substantially to a delay of a quarter wavelength of incident light at its frequency of interest, and said moving means being effective over a half of the period.

14. A light valve as claimed in claim 2, each of said gratings having an amplitude corresponding substantially to a delay of one half of a wavelength of the incident light at its frequency of interest, and said moving means being effective over a half of a period.

15. A light valve comprising two transparent sheets in close juxtaposition to one another each having on the face facing the other a relief grating identical to that on the other and oriented parallel to each other with parallel grating lines and having a depth corresponding to a fraction of the wavelength of the incident light at the frequency of interest, said fraction being one quarter or one half, and means for moving said sheets one with respect to the other in a direction perpendicular to the grating lines over a fraction of the period of said grating, said last-named fraction being one half when the first is a quarter and one quarter when the first is one half.

16. A light valve as claimed in claim 15, said first named fraction being one quarter.

17. A light valve as claimed in claim 15, said first-named fraction being one quarter.

18. A light valve as claimed in claim 1, the surface portion of one of said elements being embossed from the surface portion of the other.

19. A light valve comprising a pair of elongated transparent strips, and a support, each said strip having a surface portion which has a phase diffraction grating having the same periodicity as that of, in close juxtaposition to, and facing the like portion of the other strip, and means for moving one of said surface portions relative to the other, said strips being of piezoelectric material, said moving means comprising means to anchor said strips to said support at opposite ends of the strips and transparent electrodes on each strip to receive voltages whereby the strips respond piezoelectrically by strain in opposite directions perpendicular to the grating lines.

20. A light valve comprising two superimposed identical transparent sheets, said sheets each having one plane side and the other side with a surface described as generated by a straight line moving parallel to itself and to said one plane side and whose distance to said one side varies periodically with the same period D on both said sheets, thereby forming diffraction gratings on the said other side of said sheets, said sheets having said other sides facing each other in close proximity with the grating lines of each parallel to those of the other, and said sheets being movable one with respect to the other in a direction perpendicular to said grating lines.

21. A light valve as claimed in claim 20 wherein said distances vary sinusoidally.

22. A light valve as claimed in claim 20, wherein said distances vary rectangularly.

23. A light valve as claimed in claim 22, said rectangular gratings having depths $d_1$ and $d_2$ respectively, said depths each providing an equivalent optical path length of an integral multiple of half the wavelength of the incident light at its frequency of interest.

24. A light valve as claimed in claim 23, said multiples of half wavelength of light each being one whereby the depths $d_1$ and $d_2$ are equal and each provides an optical path length equivalent to half the wavelength of the incident light at its frequency of interest.

25. A light valve as claimed in claim 23, said moving means being effective to move one sheet with respect to the other by an odd integral multiple of a quarter of the period D.

26. A light valve as claimed in claim 25, wherein said last-named odd integral multiple is one, and hence the effective relative motion between the sheets is equal to one quarter of the period D.

27. A light valve as claimed in claim 20, said rectangular gratings having respective depths $d_1$ and $d_2$, the depth $d_1$ providing an optical path length equal to an odd integral multiple of a quarter wavelength of the incident light at its frequency of interest and the difference in the depths $d_1$ and $d_2$ providing a difference in the optical path lengths at said frequency of an integral number of wavelengths including zero.

28. A light valve as claimed in claim 27, said odd integral multiple being one and $d_1$ being equal to $d_2$, said integral number of wavelengths thus being zero.

29. A light valve as claimed in claim 27, said moving means being effective to move said one sheet with respect to the other by an odd integral multiple of half the period D.

30. A light valve as claimed in claim 29, wherein said odd integral number of half the period being one, the effective relative movement between the sheets thus being half the period D.

31. A light valve comprising a pair of transparent elements each having a surface portion which has a diffraction grating having the same periodicity as, in close juxtaposition to, having the grating lines parallel to those of, and facing the like portion of the other, and voltage responsive means for moving one of said elements relative to the other in a direction at right angles to the grating lines to provide zero order diffraction transmission responsive to an applied voltage.

32. A light valve as claimed in claim 31, comprising means for storing a level of zero order diffraction transmission responsive to a selected voltage pulse comprising means for locking in place one of said elements relative to the other elements, said level being stored when said selected pulse is terminated.

33. A light valve as claimed in claim 32, the other of said elements against which the said one of said elements is locked in place being rigid.

34. A light valve as claimed in claim 33, said locking means comprising means to press said elements against each other to inhibit relative movement, due to the friction between said elements.

35. A light valve as claimed in claim 34, said locking means comprising one of said elements.

36. A light valve as claimed in claim 34, said one element being in the form of a strip.

37. A light valve as claimed in claim 33, said locking means acting to lock said one element in place when a locking voltage is absent and to unlock said element when said locking voltage is present.

38. A device for displaying images comprising light valves, each of said valves comprising a pair of transparent elements, one of each pair having a surface portion which has a phase diffraction grating of depth d and periodicity D with parallel grating lines and the grating lines of each one of a pair having the same periodicity D as, and being parallel to the lines of the other of the pair, each said surface portion in close juxtaposition to and facing the like surface portion of the other of the pair.

39. A device as claimed in claim 38 further comprising a plurality of, said elements arranged in an array of horizontal and vertical lines.

40. A device as claimed in claim 39, the lines of said diffraction gratings being parallel to the horizontal lines of said array.

41. A device as claimed in claim 39 further comprising a transparent rigid support, each vertical line of said array comprising a vertical strip of piezoelectric polyvinylidene fluoride ($PVF_2$) of two bonded sheets and having alternating opposed U bends, the distal tip of each U of said bend being anchored to said support, said strips having as said surface portions straight surface portions between said bends.

42. A device as claimed in claim 41, in which said bonded sheets are polarized so that when the strip is energized one of the sheets expands and the other simultaneously contracts.

43. A device as claimed in claim 39 further comprising a rigid transparent support, each horizontal line of said array comprising a strip of plastic material, one surface portion of each said element being a surface portion of said horizontal line strip.

44. A device as claimed in claim 41, each horizontal line of said array comprising a strip of plastic material, each said element having as the other surface of the pair of surfaces portions of said horizontal line, said element surface portions of said horizontal lines and said element surface portions of said vertical lines thus being respective portions of the pairs of said transparent elements, the lines of said diffraction gratings of both said surface portions of each pair being parallel to said horizontal lines.

45. A device as claimed in claim 44, further comprising locking means on each horizontal line, said locking means comprising said horizontal line elements.

46. A television system for black and white images comprising a device as claimed in claim 44, and further comprising means to apply voltages to said lines to provide by said device a television picture, said grating being sinusoidal.

47. A television system for color television images comprising three devices, each as claimed in claim 44, said grating being rectangular and having a different amplitude thereby to transmit different colors.

48. A device for displaying images in response to electrical signals comprising a parallel set of vertical strips and a parallel set of horizontal strips, the intersections of said vertical and horizontal strips defining light valve elements, each element consisting of a diffraction grating on the horizontal strip and a facing diffraction grating on said vertical strip, said gratings having the same periodicity, parallel grating lines, and facing each other in close juxtaposition.

49. A device as claimed in claim 48, the lines of said gratings being parallel to said horizontal strips.

50. A device as claimed in claim 49, further comprising a transparent support, said vertical strips comprising bonded piezoelectric plastic strips bent into U bends, each element grating of said vertical strips lying between said bends, said bends alternating on each side of the elements and being bonded at their tips to and lying in said support.

51. A device as claimed in claim 50, each of said horizontal strips lying between bends of said vertical strips and comprising piezoelectric plastic material attached to said support.

52. A device as claimed in claim 51, said horizontal strips being piezoelectric and being attached to said support between each vertical strip, whereby when a selected one of said horizontal locking strips is piezoelectrically elongated it locks said element grating portions of said vertical strips along the selected horizontal line in relatively fixed position, and when piezoelectrically shortened leaves said element grating portions free for relative vertical motion.

53. A device as claimed in claim 52, comprising means to apply voltages to a selected horizontal strip to piezoelectrically elongate said horizontal locking strip, said horizontal locking strip being piezoelectrically shortened when no voltage is applied.

54. A television system comprising a device as claimed in claim 52, and further comprising means to apply video voltages simultaneously to the vertical strips and to unlock and lock the horizontal lines successively while said video voltages are applied to said vertical strips, the said elements thereby storing the light transmitting level from one frame to another.

55. A television system as claimed in claim 54, comprising means to withhold voltage from said horizontal strips thereby to store in place a television image for as long as said voltages are withheld.

56. A device as claimed in claim 52, further comprising means to illuminate said device with a substantially uniform light for transmission through said elements.

57. A device as claimed in claim 51, each of said vertical strip portions being substantially identical in mass and subject each to identical restoring forces, whereby each is subject to substantially the same period of oscillations, and means to unlock, and a quarter period of said oscillations later to lock again, said portions by means of said piezoelectric elongation and shortening of a selected horizontal line.

58. A television system as claimed in claim 54, comprising means to illuminate said elements with substantially uniformly incident light.

59. A device for image display comprising:

(1) a set of lines in a first direction comprising line segments, each segment having a transparent portion, (2) a second set of lines in a second direction transverse to said first direction and comprising line segments each segment having a transparent portion, (3) the transparent segment portions of said first and second sets overlapping to form at their intersection elements and having facing, juxtaposed diffraction gratings of the same periodicity and parallel diffraction lines whereby each element forms a light valve, and (4) means to apply an electrical signal individually to the lines of said first set to move said first set line segments in a direction perpendicular to said gratings.

60. A device as claimed in claim 59, said sets of lines comprising piezoelectric material, said means comprising transparent electrodes.

61. A device as claimed in claim 60 further comprising a transparent support and in which said first lines comprise on each side of each line of said second set a bimorph fastened to said support.

62. A device as claimed in claim 61, in which said second set of lines on each side of said first set line segments are attached to said support.

63. A device as claimed in claim 62, said second set line segments serving in one state of electrical excitation or non-excitation to act as a lock against the motion of the intersecting first line segments and in the other state to unlock for motion the intersecting first line segments.

64. An arrangement for color display comprising three display devices each as claimed in claim 59, the three devices having rectangular gratings with depths of diffraction gratings respectively to transmit magenta, yellow and red as the zero order light transmission.

65. A method of providing a light image comprising the steps of arranging in an array of vertical and horizontal lines a plurality of elements as claimed in claim 59, and individually controlling the light transmission of each.

66. A method as claimed in claim 65, comprising the steps of maintaining at a relatively fixed level of transmission all of said elements except those in a horizontal line and individually moving the said segments of each vertical line.

67. A method as claimed in claim 66, comprising the step of illuminating all said elements substantially each uniformly compared to the others.

68. A method of controlling the zero order transmission of light comprising placing in closely spaced face-to-face relationship a pair of phase diffraction gratings on a pair of transparent elements, said gratings of each pair having the same periodicity and parallel grating lines, and moving one of the elements relative to the other in a direction perpendicular to the grating lines.

69. A method as claimed in claim 68, said gratings having depths $d_1$ and $d_2$ respectively and said periodicity having a period D, the sum of the depths $d_1$ and $d_2$ of the pair of gratings at the peaks affording a delay of the incident light to be controlled compared to the delay at the troughs of an odd integral multiple of half a wavelength of said light, and comprising the further step of moving one element relative to the other by an odd multiple of half the period D.

70. A method as claimed in claim 69, both said multiples being one.

71. A method as claimed in claim 68, said gratings having depths $d_1$ and $d_2$ respectively and said periodicity having a period D, the sum of the depths $d_1$ and $d_2$ of the pair of gratings at the peaks affording a delay of the incident light to be controlled compared to the delay at the troughs of an even integral multiple of half a wavelength of said light and comprising the further step of moving one element relative to the other by an odd multiple of the period D.

72. A method as claimed in claim 71, said even multiple being two and said odd multiple being one.

73. A device for displaying images in response to electrical signals comprising a rigid transparent support having surface portions each of which has a phase diffraction grating, a plurality of transparent parallel lines, each of said transparent lines having surface portions each of which has a phase diffraction grating, the said diffraction gratings of said support and of said transparent lines having the same depth d and the same periodicity D and being in close juxtaposition, the gratings of said transparent lines facing and having grating lines parallel to those of said support.

74. In combination, a device as claimed in claim 73, and a means for illuminating said device by a line of light substantially at right angles to said transparent parallel lines.

75. In combination, a device as claimed in claim 73, and means for moving said transparent lines in a direction at right angles to the diffraction grating lines.

76. A combination as claimed in claim 75, said means for moving comprising bimorphs, one on each side of each of said lines.

77. A combination as claimed in claim 76, said support having grooves, said bimorphs being anchored in said grooves.

78. A combination as claimed in claim 77, further comprising means to damp the motion of said bimorphs.

79. A combination as claimed in claim 78, the damping of said damping means being between three and six times critical damping.

80. A combination as claimed in claim 77, said grooves carrying light absorbent material.

81. The method of operating a light valve comprising a pair of transparent elements each having a surface portion which has a phase diffraction grating of depth d and periodicity D, one of said gratings having the same periodicity D as, grating lines parallel to those of, and in close juxtaposition to, and facing the like grating of the other, comprising the steps of:

moving one of said elements and its said surface portions relative to the other in a direction perpendicular to the grating lines to vary the zero order diffraction transmission, said motion being subject to a substantially sinusoidally oscillating motion in response to a restoring force about a point of zero restoring force, releasing the one element at a first time from whatever initial position it may have, and then subjecting the element to a locking force substantial at a quarter period of said motion after said first time.

* * * * *